(12) United States Patent
Mulford et al.

(10) Patent No.: US 11,282,163 B2
(45) Date of Patent: Mar. 22, 2022

(54) METHOD FOR CONVERTING LANDSCAPE VIDEO TO PORTRAIT MOBILE LAYOUT USING A SELECTION INTERFACE

(71) Applicant: Google LLC, Mountain View, CA (US)

(72) Inventors: Brian Mulford, Palos Verdes, CA (US); Nathan Frey, Mountain View, CA (US); Alexandros Panagopoulos, Leonia, NJ (US); Yinquan Hao, Lake Grove, NY (US); Yuan Zhang, Torrance, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/769,758

(22) PCT Filed: May 24, 2018

(86) PCT No.: PCT/US2018/034390
§ 371 (c)(1),
(2) Date: Jun. 4, 2020

(87) PCT Pub. No.: WO2019/112642
PCT Pub. Date: Jun. 13, 2019

(65) Prior Publication Data
US 2021/0012502 A1 Jan. 14, 2021

(30) Foreign Application Priority Data
Dec. 5, 2017 (WO) ................ PCT/US2017/064719

(51) Int. Cl.
*G06T 3/00* (2006.01)
*G06T 7/11* (2017.01)
(Continued)

(52) U.S. Cl.
CPC ........ *G06T 3/0056* (2013.01); *G06F 3/04845* (2013.01); *G06T 7/11* (2017.01);
(Continued)

(58) Field of Classification Search
CPC ....... G06T 2210/12; G06T 2207/20132; G06T 11/20; G06T 7/11; G06T 3/0056; G06F 3/04845; G06K 9/32
See application file for complete search history.

(56) References Cited

U.S. PATENT DOCUMENTS

| 7,305,146 B2 | 12/2007 | Cheatle |
| 7,315,630 B2 | 1/2008 | Steinberg et al. |

(Continued)

FOREIGN PATENT DOCUMENTS

| JP | 2000-036032 | 2/2000 |
| WO | WO-03/005702 | 1/2003 |

OTHER PUBLICATIONS

Feng Liu Et Al: "Video Retargeting: automating pan and scan", ACM Multimedia 2006 & Co-Located Workshops:Oct. 23-27, 2006, Santa Barbara, California, USA; Proceedings, ACM Press, NY, NY, pp. 241-250.

(Continued)

*Primary Examiner* — Mia M Thomas
(74) *Attorney, Agent, or Firm* — Dority & Manning, P.A.

(57) ABSTRACT

Described herein are systems and methods of converting media dimensions. A device may identify a set of frames from a video in a first orientation as belonging to a scene. The device may receive a selected coordinate on a frame of the set of frames for the scene. The device may identify a first region within the frame including a first feature corresponding to the selected coordinate and a second region within the frame including a second feature. The device may generate a first score for the first feature and a second score (Continued)

for the second feature. The first score may be greater than the second score based on the first feature corresponding to the selected coordinate. The device may crop the frame to include the first region and the second region within a predetermined display area comprising a subset of regions of the frame in a second orientation.

18 Claims, 13 Drawing Sheets

(51) Int. Cl.
  *G06F 3/0484* (2013.01)
  *G06T 11/20* (2006.01)
  *G06F 3/04845* (2022.01)
(52) U.S. Cl.
  CPC .... *G06T 11/20* (2013.01); *G06T 2207/20132* (2013.01); *G06T 2210/12* (2013.01)

(56) References Cited

U.S. PATENT DOCUMENTS

| | | | |
|---|---|---|---|
| 7,864,978 | B2 | 1/2011 | Anthony et al. |
| 10,235,998 | B1* | 3/2019 | Khaleghi ............ G10L 15/1815 |
| 10,559,307 | B1* | 2/2020 | Khaleghi ................ G10L 15/26 |
| 2006/0188173 | A1 | 8/2006 | Zhang et al. |
| 2008/0019661 | A1* | 1/2008 | Obrador ................. H04N 5/144 386/210 |
| 2009/0251594 | A1 | 10/2009 | Hua et al. |
| 2010/0290705 | A1 | 11/2010 | Nakamura |
| 2012/0282911 | A1* | 11/2012 | Davis .................... G06F 3/0482 455/418 |
| 2013/0108164 | A1 | 5/2013 | Ptucha |
| 2013/0108175 | A1 | 5/2013 | Ptucha |
| 2015/0201187 | A1* | 7/2015 | Ryo .......................... G09G 5/00 348/51 |
| 2015/0228067 | A1 | 8/2015 | Downing et al. |
| 2019/0034734 | A1* | 1/2019 | Yen ......................... G06T 7/246 |
| 2019/0182415 | A1* | 6/2019 | Sivan ...................... G06F 1/163 |
| 2020/0218901 | A1* | 7/2020 | Elder ................. G06K 9/00724 |
| 2020/0351449 | A1* | 11/2020 | Oh .......................... H04L 67/38 |
| 2021/0117712 | A1* | 4/2021 | Huang ..................... G06F 3/013 |

OTHER PUBLICATIONS

International Search Report regarding PCT/US2018/034390 dated Jul. 26, 2018.
Written Opinion of International Searching Authority regarding PCT/US2018/034390 dated Jul. 26, 2018.
Office Action for CN Appln. Ser. No. 201880075932.9 dated Nov. 26, 2020 (17 pages).
Examination Report for IN Appln. Ser. No. 20207019563 dated Jun. 1, 2021 (6 pages).
Examination Report for EP Appln. Ser. No. 18728785.9 dated Feb. 19, 2021 (6 pages).
Chen et al., "A visual attention model for adapting images on small displays", Multimedia Systems, vol. 9, Oct. 2003, pp. 353-364 (12 pages).
Examination Report for EP Appln. Ser. No. 17826624.3 dated Mar. 2, 2020 (7 pages).
Fan et al., "Looking into Video Frames on Small Displays", Multimedia '03: Proceedings of the Eleventh ACM International Conference on Multimedia, Nov. 2, 2003, pp. 247-250, XP058170090 (10 pages).
Final Office Action for U.S. Appl. No. 16/322,464 dated Jul. 2, 2020 (17 pages).
International Preliminary Report on Patentability, Ch. I, for PCT Appln. Ser. No. PCT/US2016/065025 dated Jun. 20, 2019 (10 pages).
International Preliminary Report on Patentability, Ch. I, for PCT Appln. Ser. No. PCT/US2017/064542 dated Jun. 11, 2019 (7 pages).
International Preliminary Report on Patentability, Ch. I, for PCT Appln. Ser. No. PCT/US2017/064719 dated Jun. 11, 2019 (9 pages).
International Preliminary Report on Patentability, Ch. I, for PCT Appln. Ser. No. PCT/US2018/034390 dated Jun. 18, 2020 (8 pages).
International Search Report and Written Opinion for PCT Appln. Ser. No. PCT/US2016/065025 dated Aug. 23, 2017 (12 pages).
International Search Report and Written Opinion for PCT Appln. Ser. No. PCT/US2017/064542 dated Feb. 15, 2018 (9 pages).
International Search Report and Written Opinion for PCT Appln. Ser. No. PCT/US2017/064719 dated Feb. 2, 2018 (12 pages).
International Search Report and Written Opinion for PCT Appln. Ser. No. PCT/US2018/034390 dated Jun. 26, 2018 (10 pages).
Kopf et al., "Algorithms for video retargeting", Multimedia Tools and Applications, vol. 51, No. 2, Jan. 7, 2011, pp. 819-861 (43 pages).
Liu et al., "Video Retargeting: Automating Pan and Scan", MM 2006: Proceedings of the 14th ACM International Conference on Multimedia, Oct. 23, 2016, pp. 241-250, XP002605061 (10 pages).
Non-Final Office Action for U.S. Appl. No. 16/322,464 dated Mar. 13, 2020 (15 pages).

* cited by examiner

METHOD FOR CONVERTING LANDSCAPE VIDEO TO PORTRAIT MOBILE LAYOUT USING A SELECTION INTERFACE

CROSS-REFERENCE TO RELATED APPLICATIONS

The present application is a National Stage Application, filed under 35 U.S.C. 371, of International Patent Application No. PCT/US2018/034390 filed on May 24, 2018 titled "METHOD FOR CONVERTING LANDSCAPE VIDEO TO PORTRAIT MOBILE LAYOUT USING A SELECTION INTERFACE," which in turn claims the benefit of and priority to PCT/US2017/064719 filed on Dec. 5, 2017 titled "METHOD FOR CONVERTING LANDSCAPE VIDEO TO PORTRAIT MOBILE LAYOUT USING A SELECTION INTERFACE," and claims the benefit of and priority to PCT/US2016/065025 titled "METHOD FOR CONVERTING LANDSCAPE VIDEO TO PORTRAIT MOBILE LAYOUT," filed Dec. 5, 2016, the entirety of which are incorporated by reference herein.

BACKGROUND

In a networked environment, such as the Internet or other networks, first-party content providers can provide information for public presentation on resources, such as webpages, documents, applications, and/or other resources. The first-party content may include text, video, and/or audio information provided by the first-party content providers via a resource server for presentation on a client device over the Internet. Videos and similar media recorded in a wide aspect ratio that may be designed to be viewed on a desktop or in a landscape orientation, may not directly fit full screen onto a mobile device held in vertical or portrait orientation, and typically are either cropped to the center, losing detail at the left and right edges of the video, or are surrounded with black bars at the top and bottom, reducing the display size of the video. Vertical orientation media is a popular format for viewing and displaying media in many applications. Since many videos and other media are recorded only in a wide aspect ratio layout, there is a large amount of inventory for this layout while demand for publishers is increasingly needed for portrait layouts.

SUMMARY

Most media may be in a landscape dimension, rather than in a portrait dimension. In contrast, displays on most mobile phones may be taller than wider, and thus may be more suitable for content in the portrait dimension. As such, when media in the landscape dimension is presented on the display in the portrait dimension, there may be large amount of negative space around the media. Techniques to eliminate the negative space may include cropping the media in the landscape dimension to fit the portrait dimension. Each frame in the media may be cropped based on the features identified within the frame. Features detected may include face tracking, object detection and/or recognition, text detection, detection of dominant colors, motion analysis, scene change detection, and image saliency. The identification of multiple salient features in the frame, however, may result in cropping of the media to include other features irrelevant to the viewer. A suboptimal cropping may lead to a need to regenerate the cropped media.

To address the suboptimal cropping, the present techniques may leverage human-assisted tagging of salient features to crop the media. In one implementation, a system may apply scene boundary detection algorithms to identify scenes of the media. A graphical user interface may allow a user to mark coordinates corresponding to a salient feature in a frame of the media for each identified scene. The computing device may identify the salient feature from the coordinates marked by the user.

Afterwards, the system may traverse over the frames of the media for the scene to identify other features using various image object recognition algorithms. For each of the other recognized features, the system may calculate a weight. The feature marked by the user, however, may be assigned the highest weight. The system may crop over the features of the media to the size of the portrait dimensions of the display of a mobile computing device based on the weights of the feature marked by the user and the other features recognized by the object recognition algorithm.

This process may be iterated multiple times to obtain the media in the portrait dimension. While prior techniques may have resulted in suboptimal cropping and subsequent need to regenerate cropped media, the present techniques provide an improved user interface that allows for a user to more efficiently generate videos. By obtaining user inputs in this process, the present techniques may allow for more relevant media, thereby more quickly obtaining more accurate media and reducing a number of times media need be regenerated. By weighting the features marked by the user more highly, this can help ensure that weights applied by the system to other recognized features do not negatively affect a cropped media. Furthermore, although primarily described in terms of cropping or converting from portrait video to landscape video, the same techniques may be used to crop or convert from landscape video to portrait video, such as for use in vertical displays, conversion of traditional content for mobile phone consumption, etc.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Various implementations and applications are provided primarily for illustrative purposes.

"Dumb" cropping to the center of an image or video relies on an assumption that the most important content of the video or image occurs in the center of the image. This may be incorrect as important content may be off-center, such as text at the bottom of a screen or a person at a "one-third" position horizontally in the frame. A video showing a person entering a room may include the person entering from one side of the frame, while the remainder of the frame is static, or a video with two people talking may place each at the sides of the frame with empty space between them. Applying center cropping in such instances may result in an empty room or empty space, potentially confusing and frustrating the viewer.

Accordingly, disclosed herein are systems and methods for intelligent or "smart" cropping to automatically convert a video or image in landscape mode to fit in portrait mode, or vice versa, while remaining in full screen without merely applying "dumb" or center cropping or adding padding to the top/bottom. Conversion can include detection of parts of the image or video (e.g., features) for each frame that are important. Based on the identified important areas, the image or video may be intelligently cropped or padded to retain important features while discarding unimportant regions, static borders, etc. Features detected may include face tracking, object detection and/or recognition, text detection, detection of dominant colors, motion analysis, scene change detection, and image saliency. Detection and recognition can use methods and algorithms that are deep learning based. Text detection may use optical character recognition (OCR). Detection of features allows for an optimal cropping path. Other aspects of the invention may include padding the image to match the background color and removing and/or reformatting any borders to fit the new display mode. Although primarily discussed in terms of video, in many implementations the systems may be applied to individual images or frames.

Figure 1:
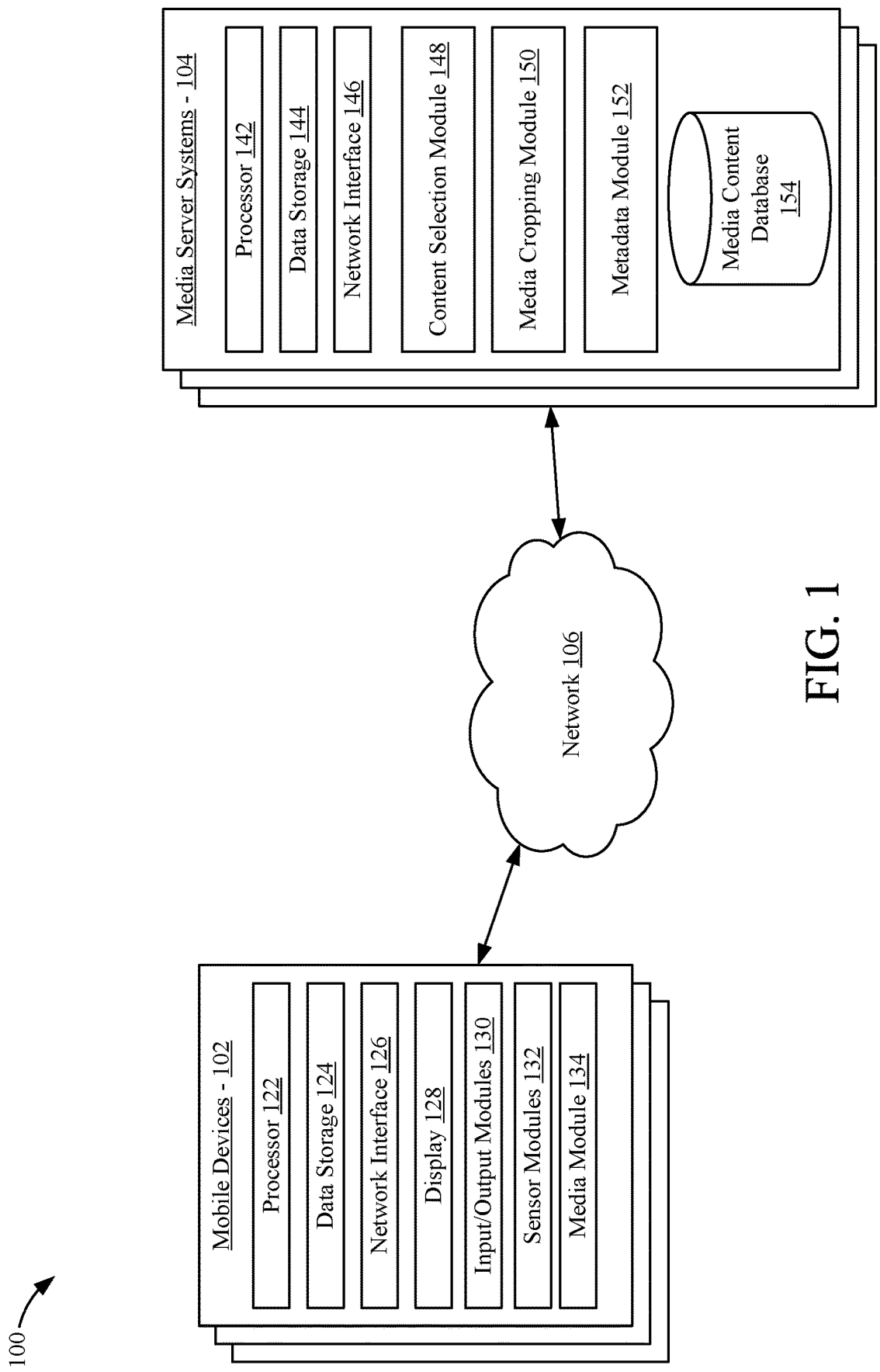
FIG. 1 is a block diagram depicting an implementation of an environment for automatic conversion of media from one orientation to another.

FIG. 1 is a block diagram of an implementation of an environment 100 for automatic conversion of video from one orientation to another over a network 106. The network 106 may include a local area network (LAN), wide area network (WAN), a telephone network, such as the Public Switched Telephone Network (PSTN), a wireless link, an intranet, the Internet, or combinations thereof. The environment 100 also includes mobile devices 102. In some implementations, mobile devices 102 include a processor 122, data storage 124, a network interface 126, a display 128, input/output modules 130, sensor modules 132, and media modules 134. Sensor module 132 can contain sensors to detect orientation of computing devices (e.g., an accelerometer and/or magnetometer) and other similar sensors contained in many mobile devices. The processor 122 may include a microprocessor, an application-specific integrated circuit (ASIC), a field-programmable gate array (FPGA), etc., or combinations thereof. The data storage 124 may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor 122 can read instructions. The instructions may include code from any suitable computer programming language such as, but not limited to, C, C++, C#, Java®, JavaScript®, Perl®, HTML, XML, Python®, and Visual Basic®.

The mobile device 102 can include one or more devices such as a computer, laptop, smart phone, tablet, personal digital assistant configured to communicate with other devices via the network 106. The device may be any form of portable electronic device that includes a data processor and a memory. The data storage 124 may store machine instructions that, when executed by a processor, cause the processor to perform one or more of the operations described herein. The data storage 124 may also store data to effect presentation of one or more resources, content items, etc., on the computing device. The processor may include a microprocessor, an application-specific integrated circuit (ASIC), a field-programmable gate array (FPGA), etc., or combinations thereof. The data storage 124 may include, but is not limited to, electronic, optical, magnetic, or any other storage or transmission device capable of providing processor with program instructions. The data storage 124 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The mobile device 102 can execute a software application (e.g., a web browser or other application) to retrieve content from other computing devices over network 106. Such an application can retrieve first-party content from a media server system 104. In some cases, an application running on the mobile device 102 may itself be first-party content (e.g., a game, a media player, etc.). In one implementation, the mobile device 102 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a media server system 104). The other device may then provide web page data and/or other data to the mobile device 102, which causes visual indicia to be displayed by the display of the mobile device 102. Accordingly, the browser window displays the retrieved first-party content, such as web pages from various websites, to facilitate user interaction with the first-party content.

In some implementations, the media module 134 of the mobile devices 102 can receive a plurality of frames of media and associated metadata. The media may include video (e.g. frames of video), images, photos, rendered content, panoramic content, 3-dimensional content, or any other type and form of visual media content, and may be accompanied by audio content. The media may be received over a network interface 126 and stored in data storage 124. In some implementations, the frame of media is received as part of streaming media data. The streaming media may be received over the network interface 146. In some implementations, the media module 134 can identify region in the frame, based on the received metadata. In some implementations, the media module 134 can crop the frame of media based on the region. In some implementations, the cropped area is further based on one or more of frames of media preceding and/or following the frame of media.

In some implementations, the media module 134 of the mobile devices 102 can receive an indication of a change in orientation from one or more sensor modules 132. In some implementations, the media module 134 can dynamically adjust the cropping of playing media based on a change in orientation.

The media server system 104 can include a processor 142, data storage 144, a network interface 146, a content selection module 148, a media cropping module 150, a metadata module 152, and a media content database 154. In some implementations, the content selection module 148 of the media server system 104 can select media from the media content database 154. In some implementations, the media cropping module 150 can pre-process media, analyze the media for features and/or objects, and crop the media based on the analysis of the features and/or objects. In some implementations, the metadata module 152 can extract data based on pre-processing media, analyzing the media for features and/or objects, and determination of a cropping path for a target aspect ratio or resolution. Although shown on media server system 104, in many implementations, media cropping module 150 may be executed on one or more mobile devices 102.

The media server system 104 can include a media cropping module 150. In some implementations, the media cropping module 150 can pre-process media, analyze the media for features and/or objects, and crop the media based on the analysis of the features and/or objects. In some implementations, the media cropping module 150 can determine whether cropping is needed based on if one or more values of a target aspect ratio is smaller than the current values of the aspect ratio of the frames of media being analyzed. In some implementations, the media cropping module 150 can only crop the frames of the media if one or more values of a target resolution is smaller than the current values of the resolution of the frame of media. In some implementations, the media cropping module 150 can crop the media to match a target aspect ratio or to match a target resolution. The media cropping module 150 can add additional padding to one or more sides of the cropped frame of media to match the target aspect ratio or to match the target resolution. In some implementations, the media cropping module 150 can further base the cropped area on one or more of frames of the media preceding and/or following the current frame of media being cropped. In some implementations, the media cropping module 150 can include one or more regions that exceeds a threshold. In some implementations, the media cropping module 150 can at least include one or more regions of a plurality of regions with scores that exceed a threshold value are considered when the media cropping module 150 is determining the region to include when cropping the frame of media.

In some implementations, the metadata module 152 can extract data based on pre-processing media, analyzing the media for features and/or objects, and determination of a cropping path for a target aspect ratio or resolution. In some implementations, the metadata module 152 can receive the metadata as part of the media file containing a plurality of frames of media. In some implementations, the metadata module 152 can receive the metadata independently, along with an identifier or other data associating the metadata with the received plurality of frames of media. In some implementations, the metadata module 152 can analyze the metadata to determine the portion s of data related to regions associated with one or more of the frames of media associated with the media. In some implementations, the metadata module 152 can extract bounding information of one or more regions for each of the plurality of frames of the media included in the metadata. In some implementations, the metadata module 152 can extract locations within each of the plurality of frames of the media of one or more features. Features may include objects such as automobiles, buildings, people, animals, street signs, and the like, text, borders of the frame of media, uniform color padding of one or more sides of the frame of media, etc. In some implementations, the metadata module 152 can identify a plurality of features and/or regions of one or more of the plurality of frames of the media. In some implementations, the metadata module 152 can associate the received metadata with a target aspect ratio or a target resolution.

Figure 2A:
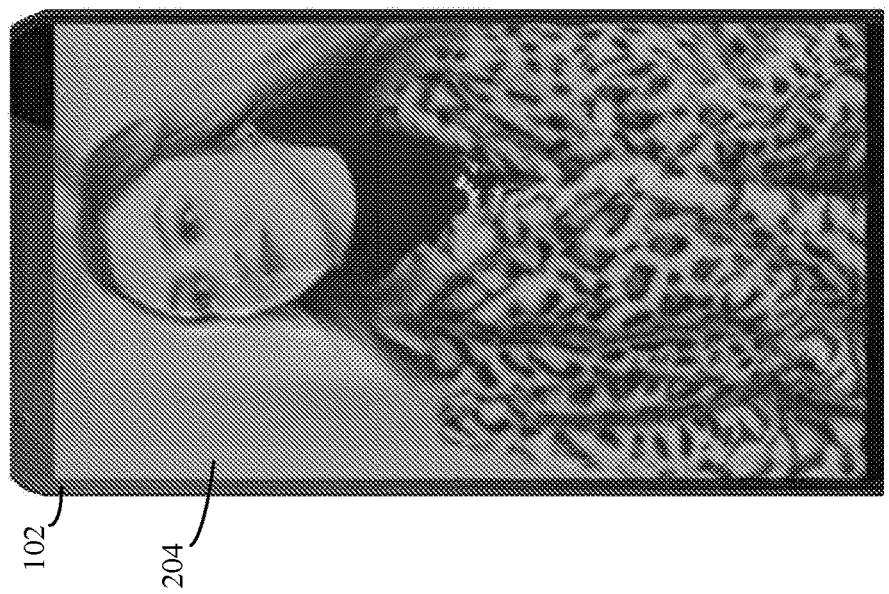
FIG. 2A is an illustration depicting cropping a single frame of media in an implementation of a use case.
Figure 2A:
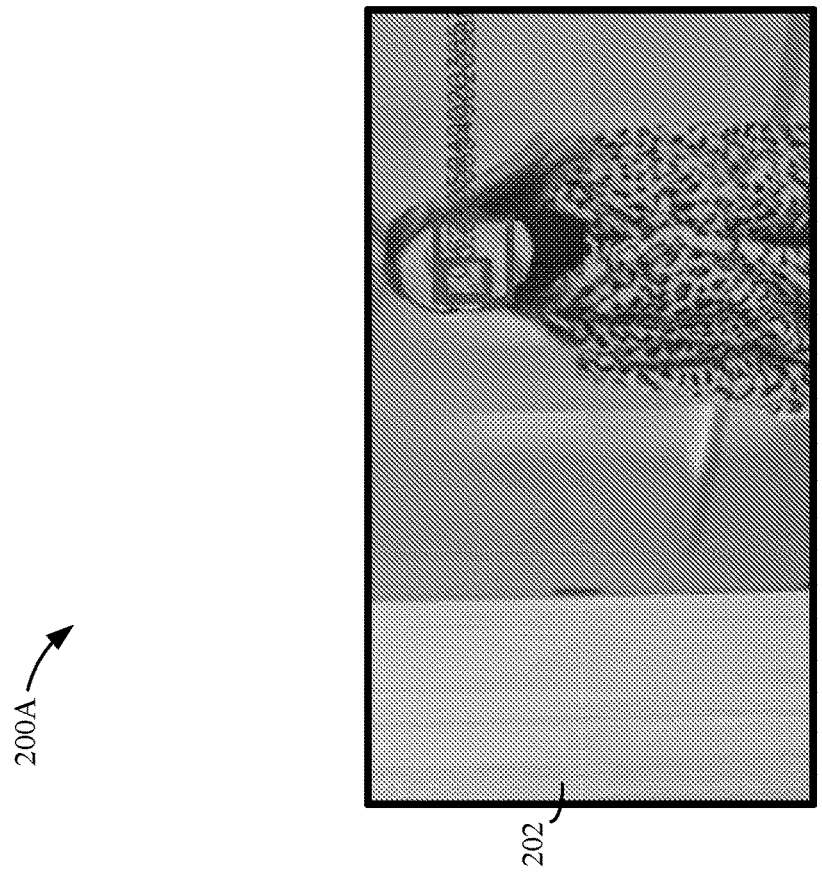

FIG. 2A depicts cropping a single frame of media in an implementation of a use case. The input image 202 can be in a horizontal or landscape orientation as shown. Once the input image 202 is processed to detect the important objects and/or features of the input image 202, the regions containing the important objects and/or features are retained to the extent possible when generating output image 204. In FIG. 2A, output image 204 is shown in a vertical or portrait orientation displayed on a mobile device 102. In this depiction of an implementation of the use case, facial features are identified in the input image 202 and the region comprising the facial features is retained in the output image 204 displayed on the mobile device 102.

Figure 2B:
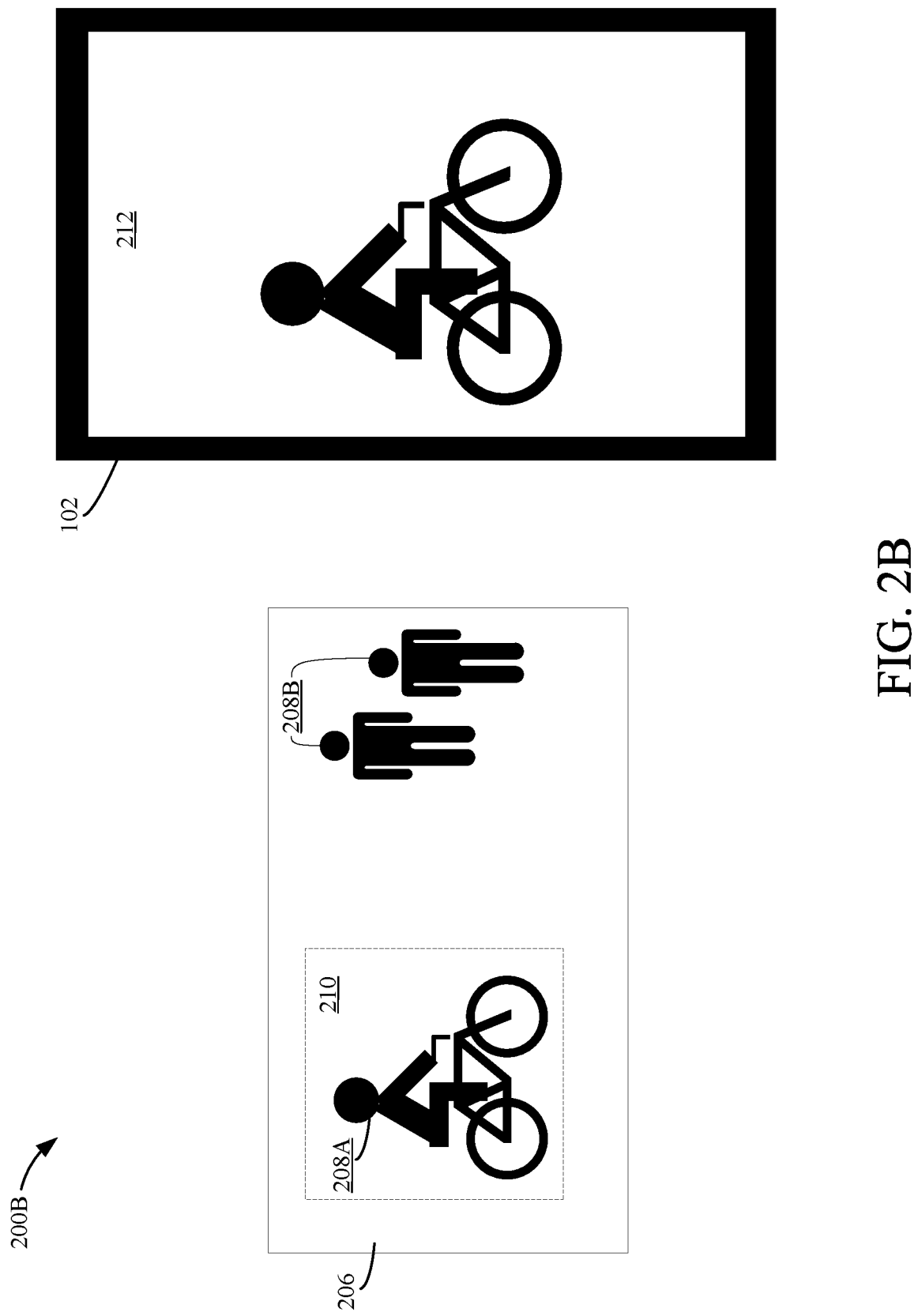
FIG. 2B is an illustration depicting cropping a single frame of media based on a selection of a bounding box in an implementation of a use case.

FIG. 2B depicts cropping a single frame of media in an implementation of a use case. The input image 206 can be in a horizontal or landscape orientation as shown. The input image 206 may be determined to have multiple features: a figure on a bicycle 208A and two FIGS. 208B. A bounding box 210 may be used to select a rectangular region containing the figure on the bicycle 208A. Once the input image 206 with the bounding box 210 is processed, the regions containing the selected feature of the figured on the bicycle 208A may be retained to the extent possible when generating the output image 212. As seen on FIG. 2B, the output image 212 is shown in a vertical or portrait orientation displayed on the mobile device 102. In this depiction of an implementation of the use case, the figure on the bicycle 208A selected using the bounding box 210 is retained in the output image 204 displayed on the mobile device 102.

Figure 2C:
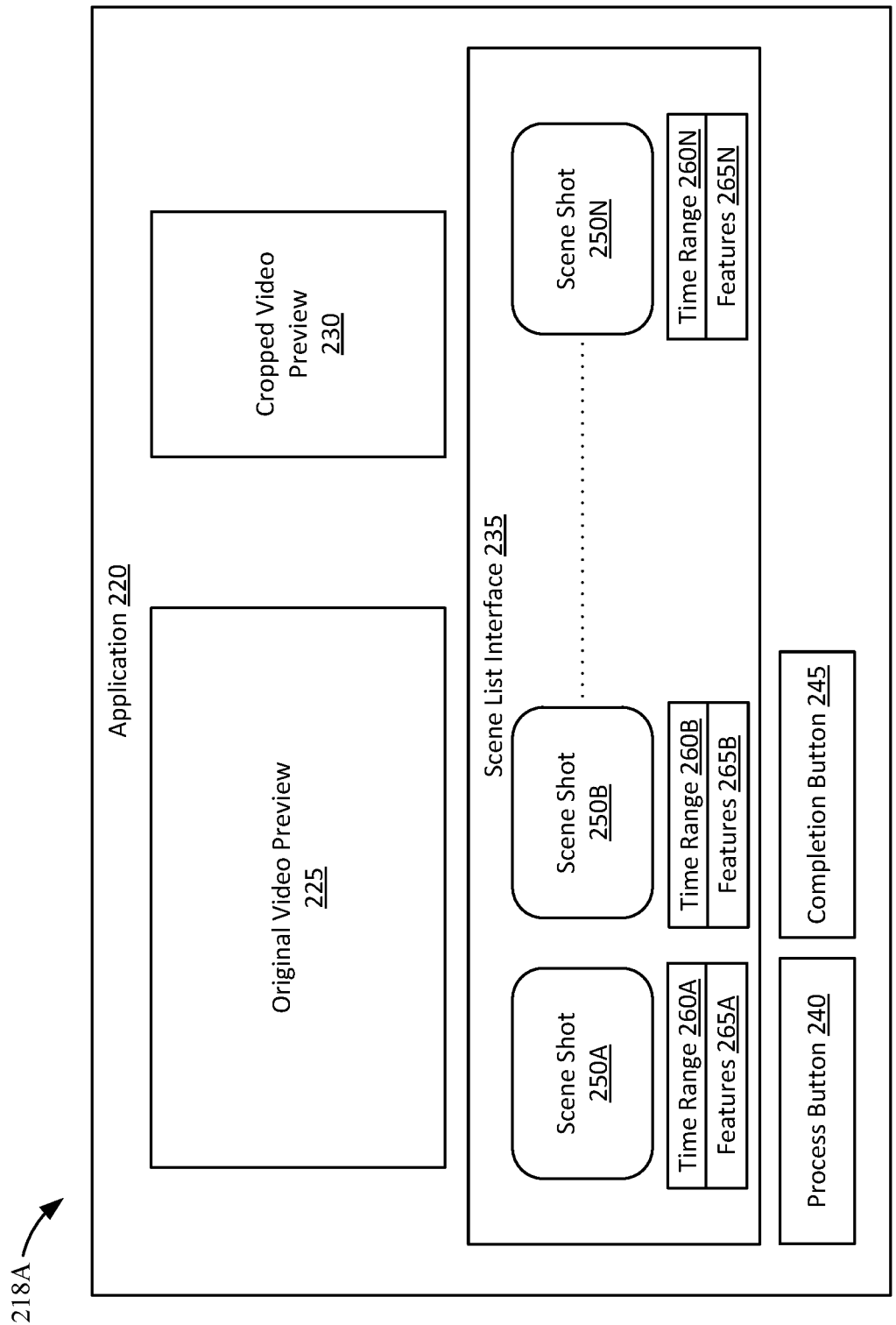
FIGS. 2C and 2D are block diagrams depicting a graphical user interface of an application for cropping frame of media using selection data.
Figure 2D:
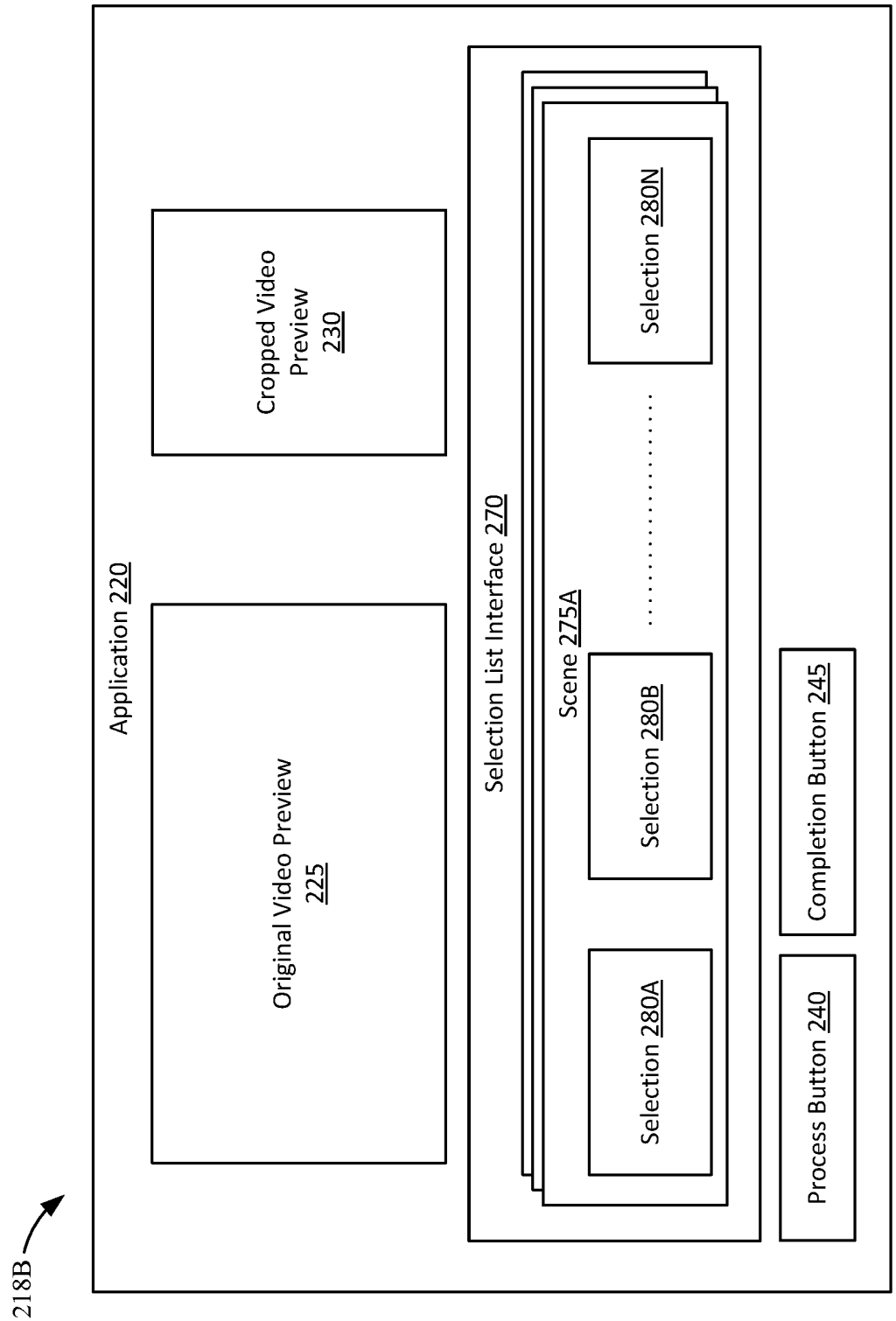

FIGS. 2C and 2D show a graphical user interface of an application 220 for cropping frames of media using selection data. In the context of FIG. 1, the application 220 may be a part of and may be provided by the media cropping module 150. The application 220 may include executable instructions to be processed by one or more processors. An administrator may use the graphical user interface of the application 220 to automatically crop frames of each scene in media using selection data. Beginning with FIG. 2C, the application 220 may include an original video preview 225, a cropped video preview 230, a scene list interface 235, a process button 240, and a completion button 245. The original video preview 225 may include a video player to playback an unedited version of the media. The cropped video preview 230 may include a video player to playback a cropped version of the media. The scene list interface 235 may include one or more scene shots 250A-250N, a time range 260A-260N for each scene shot 250A-250N, and a list of features 265A-265N for each scene shot 250A-250N. One or more scenes may be identified by the media cropping module 150. Based on the identification, a representative frame (e.g., a median frame) may be selected for display for the corresponding scene shot 250A-250N. In addition, a time range 260A-260N for each scene may be identified and displayed within the scene list interface 235. Moreover, one or more features may be detected from the frames of each scene using image analysis techniques detailed herein, and may be used to populate the list of features 265A-265N.

Moving onto FIG. 2D, for each scene identified, the graphical user interface may be used to make selections 280A-280N. The selections 280A-280N may be particular to the frames of a scene 275A, and may specify coordinates or a range of coordinates (e.g., bounding box 210) within one frame of the scene 275A. The selections 280A-280N may correspond to a feature identified on the frames of the scene 275A. Upon interaction with the process button 240, the selections 280A-N may be used to crop the frames of the scenes 275A-275N. The cropped frames of the scenes 275A-275N may be used to generate a cropped video for playback in the cropped video preview 230. Additional or different selections 280A-280N may be made after the initial generation of the cropped video iteratively update or change the cropping of the frames of each scene 275A-275N. By interacting with the completion button 245, the cropping of the frames of the media may be effected.

Figure 3:
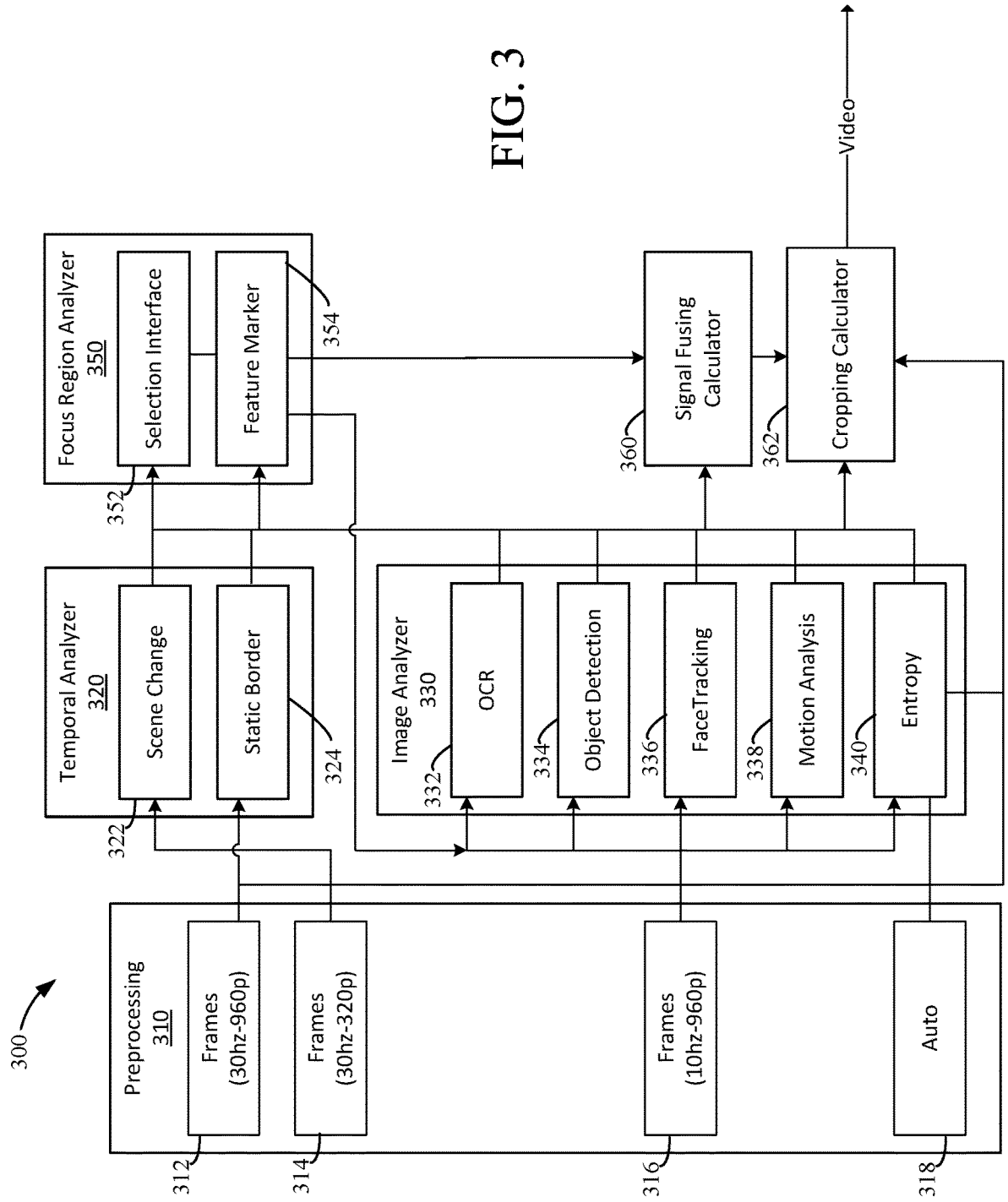
FIG. 3 is a block diagram depicting an implementation of software and/or hardware modules configured for media pre-processing, media analysis, and cropping of received media.

FIG. 3 is a block diagram of an implementation of software and/or hardware modules for media pre-processing, media analysis, and cropping of received media. In some implementations, the preprocessing module 310 can preprocess the media and down convert the media using down converter 312, down converter 314, down converter 316, down converter 318, and the like. Down converters 312-318 may have different output settings, as shown. In some implementation, the preprocessing module 310 can send the resulting output to one or more of a temporal analyzer 320, an image analyzer 330, and a focus region analyzer 350. The temporal analyzer 320 may comprise a scene change detector 322 and a static border detector 324.

The image analyzer 330 may comprise an OCR 332 module, object detector 334, face-tracking 336 module, motion analysis 338 module, and entropy 345 module. The temporal analyzer 320 and the image analyzer 330 can send data results to a signal fusing calculator 360 and a cropping calculator 362. In some embodiments, the data results from the temporal analyzer 320 and the image analyzer 330 may be sent to the focus region analyzer 350. The focus region analyzer 350 may send selection data to the image analyzer 330, the signal fusing calculator 360, and the cropping calculator 362.

Although shown separately, in many implementations, temporal analysis and image analysis modules may be part of the same analyzer system or module. Similarly, components illustrated within temporal analysis and image analysis modules may be separate from the temporal analysis or image analysis module, or may be provided by other modules. In some implementations, the image analyzer 330 can encompass a deep learning inference model that may be trained using input data. In some implementations, the input data may be input based on marked or selected regions.

In some implementations, a temporal analyzer 320 may comprise an application, applet, service, server, daemon, routine, or other executable logic for performing analysis on a sequence of images, such as images of a video. The temporal analyzer 320 may comprise a scene change detector 322 that can analyze a plurality of frames of media to determine scene changes. Scene change detector 322 may comprise an application, applet, service, server, daemon, routine, or other executable logic for identifying differences between consecutive images that indicate a scene change or significant break in a video. In some implementations, the scene change detector 322 can determine scene changes by using key point detection to analyze when there is a large change in the key points indicating a scene break or a change in scene. In some implementations, the scene change detector 322 can compare all pixels in one frame to the pixels in a successive frame and if more than a certain threshold of pixels are different when considered as part of an optical flow, it may be an indication of a scene change. Based on the comparison of pixels, the scene change detector 322 can identify one or more sets of frames in the video, with each set belonging to a particular scene.

In some implementations, the scene change detector 322 can calculate a motion vector between a plurality of frames of media and a lack of a coherent motion vector between successive frames indicates a scene change. Features may then be identified within a particular scene and the regions containing the particular features tracked among the plurality of frames of media within a particular scene. In some implementations, the scene change detector 322 can track the information of where the particular features are within the plurality of frames of media and such information is also used to determine where to crop the frame of media based on the region.

In some implementations, the temporal analyzer 320 can include a static border detector 324 that can analyze a plurality of frames of media to determine whether and where there are static borders. Static border detector 324 may comprise an application, applet, service, server, daemon, routine, or other executable logic for identifying static borders remaining substantially unchanged between consecutive images indicating a border on at least one edge of the frame. In some implementations, the static border detector 324 can receive a plurality of frames of media and configured to analyze the plurality of frames of media to look for static borders along the edges of the plurality of frames. In some implementations, the static border detector 324 can locate borders by selecting one or more random pixels and compare lines of pixels vertically and/or horizontally to the random pixels to determine if there are unbroken lines of pixels that are close in color to the randomly selected pixels. Such lines of pixels may extend across the entire image, in some implementations, or a part of the image (e.g., quarter of the image). In some implementations, the static border detector 324 can locate borders that are static from one frame to the next and contain pixels that are relatively uniform in color. In some implementations, the static border detector 324 can locate borders that are static from one frame to the next and contain pixels that are relatively uniform in color, but also contain some additional static information such as text embedded in the border that is of a different color. Once a border is located, whether or not it contains embedded text, it can be treated during the processing of the cropping as an image.

In some implementations, the image analyzer 330 can include an optical character recognition (OCR) analyzer 332 that can detect text embedded in image data. The image data may be one or more frames of media such as video. OCR analyzer 332 may comprise an application, applet, service, server, daemon, routine, or other executable logic for identifying text embedded in the image data of the one or more frames of media. In some implementations, OCR analyzer 332 may compare predetermined vectors or bitmap images corresponding to letters to a portion of an image, such as via a sliding window. In some implementations, OCR analyzer 332 may select reference images (e.g., letters) based on previous letters (e.g., according to a text prediction system), which may improve efficiency.

In some implementations, the image analyzer 330 can include an object detector 334 that can use a neural network trained on different objects, such as via tens, hundreds, or thousands of reference images of objects. Object detector 334 may comprise an application, applet, service, server, daemon, routine, or other executable logic for identifying visual objects (i.e., data that when displayed creates a visual representation of an object) in one or more frames of media. The object detector 334 can detect objects such as automobiles, buildings, people, animals, street signs, and the like, text, borders of the frame of media, uniform color padding of one or more sides of the frame of media, etc. The neural network may identify similar elements in images of an object and create a categorization of elements representative of an object that may then be used to identify objects in new images. In some embodiments, the object detector 334 may use a semantic knowledge graph to identify one or more keywords associated with each object identified in the one or more frames of the video. The semantic knowledge graph may include a mapping between a visual object and the one or more keywords. The image analyzer 330 may generate bounding boxes surrounding identified objects, such that the bounding boxes may be tracked from image to image.

In some implementations, the image analyzer 330 module can include a face-tracking 336 module that can receive a plurality of frames of media and analyze the plurality of frames of media to detect facial features, e.g., via eigenfaces or similar structures. Face-tracking 336 module may comprise an application, applet, service, server, daemon, routine, or other executable logic for identifying similarities between one or more consecutive frames of a media that upon display create a visual representation of one or more faces and the relative motion of the one or more faces. Face tracking may then be implemented by tracking the facial features to matching facial features in each of the plurality of frames of media.

In some implementations, the image analyzer 330 can include a motion analysis 338 module that can analyze the motion of objects detected in a plurality of frames of media and to calculate a motion vector between the plurality of frames of media. Motion analysis 338 module may comprise an application, applet, service, server, daemon, routine, or other executable logic for identifying similarities between one or more consecutive frames of a media that upon display create a visual representation of one or more objects and the relative motion of the one or more objects. In some implementations, the motion analysis 338 module as configured to calculate a global motion vector from a difference in pixels in a region of a first frame of media to the pixels of a second frame of the media.

In some implementations, the analyzer 330 can include an entropy 340 module that can analyze the entropy of each frame in a plurality of frames of media and to calculate a difference in entropy (a measure of the amount of change or difference that has occurred from one frame to another) to determine key frames. Entropy 340 module may comprise an application, applet, service, server, daemon, routine, or other executable logic for analyzing the entropy of one or more frames of media. In some implementations, the entropy 340 module can analyze entropy between identified regions of frames of media to calculate a difference in entropy to determine key regions. In some implementations, the entropy 340 module can extract values from the plurality of frames of media that characterizes the randomness of motion vectors associated with regions in the frames allowing the plurality of frames of media to be segmented into distinct events (e.g., scene changes in a video).

In some implementations, the focus region analyzer 350 can include a selection interface 352 to select one or more coordinates in one or more frames of each scene identified by the scene change detector 322. The selection interface 352 can include an application, applet, service, server, daemon, routine, or other executable logic for identifying selection data (e.g., coordinates or keywords) via a graphical user interface, such as the interface for the application 220 as depicted in FIGS. 2C and 2D. The selection interface 352 can receive the one or more selected coordinates via the graphical user interface. In some implementations, the selection interface 352 can receive one or more bounding area (e.g., the bounding box 210 as seen on FIG. 2B) on the one or more frames of each scene. The bounding area may be of any shape, such as a triangle, a rectangular box, or a nonagon, used to demarcate a region of the frame. In some implementations, the selection interface 352 may receive a feature identifier via the graphical user interface. The feature identifier may include one or more keywords associated with a particular feature on the one or more frames of the video. In some implementations, the selection interface 352 may select the one or more coordinates in the one or more frames of each scene in the video, subsequent to at least one cropping of the video. The selected coordinate may be outside the initial cropping of the video.

In some implementations, the focus region analyzer 350 can include a feature marker 354 to identify one or more features within each frame corresponding to the one or more coordinates selected from the selection interface 352. The feature marker 354 can include an application, applet, service, server, daemon, routine, or other executable logic for identifying the one or more features within each frame using the selection data from the selection interface 352. In some implementations, the functionalities of the feature marker 354 can be performed by the image analyzer 330 and the data from the selection interface 352 may be fed into the image analyzer 330. In some implementations, the feature marker 352 may receive the one or more features identified for each frame of the video from the image analyzer 330. The feature marker 354 can identify one or more features within the frame corresponding to the selection data. In some implementations, the feature marker 354 can identify the feature on the selected coordinate or most proximate to the selected coordinate. In some implementations, the feature marker 354 can identify one or more features within the bounding area. In the example depicted in FIG. 2B, the image analyzer 330 may have already detected a presence of the figure on the bicycle 208A and the FIG. 208B. Based on the bounding box 210 around the figure on the bicycle 208A, the feature marker 354 may identify the figured on the bicycle 208A as within the bounding box 210. In some implementations, the feature marker 354 can identify one or more features within the entirety of the frame corresponding to the feature identifier received via the selection interface 350 using the semantic knowledge graph. Based on the features identified as within the frame, the feature marker 354 can identify one or more keywords associated with each feature based on the semantic knowledge graph. The feature marker 354 can also determine whether any of the one or more keywords for each feature semantically match the feature identifier using the semantic knowledge graph.

In some implementations, the feature marker 354 can identify the one or more features corresponding to the one or more selected coordinate, one or more bounding areas, or the feature identifier in the other frames of the same scene. The selection interface 352 may have been used to select the coordinate, one or more bounding areas, or the feature identifier for one particular frame. As such, the same feature corresponding to the selection may be located in a different location on the other frames. The feature marker 354 can traverse through the set of frames identified by the scene change detector 322 as belonging to the same scene. While traversing through each of the other frames of the same scene, the feature marker 354 can identify the one or more features corresponding to the one or more features of the frame used to make the selection of the coordinate, bounding area, or the feature identifier. In some implementations, the feature marker 354 can determine a motion vector of the feature across frames of the same scene using motion analysis. The feature marker 354 can identify the coordinates and the bounding areas in the frames of the same scene for the one or more features corresponding to the selection.

In some implementations, the signal fusing calculator 360 can merge the data from the temporal analyzer 320, the image analyzer 330, and the focus region analyzer 350 and determine the important objects and/or features of an entire scene comprising a plurality of frames of the media. The merged data may then be used by the cropping calculator 362 module to crop the plurality of frames of media to regenerate the media. To determine a subset region of each frame to crop the media, the cropping calculator 362 can generate a score for each feature identified in the frame. For the feature corresponding to the selection received via the selection interface 352, the cropping calculator 362 can assign a higher score than the scores of the one or more features identified without the selection interface 352. In some implementations, the cropping calculator 362 can determine a distance between a feature and the feature corresponding to the selection. Based on the distance and the characteristics of the feature, the cropping calculator 362 can generate the score for the identified feature. In some implementations, the closer the distance, the higher the score may be; and the further the distance, the lower the score may be. In other implementations, scores may be reversed (e.g. with a lower score indicating higher salience or relevance). In some implementations, the score-to-distance relationship may be linear, while in other implementations, it may be non-linear (e.g. stepwise, piecewise linear, geometric, exponential, etc.). The score for the selected feature may be set to a predetermined margin over the highest score among the other features identified in the frames.

Based on the scores, the cropping calculator 362 can also identify a subset of the features with the highest N subset scores for each scene. Once identified, the cropping calculator 362 can crop the frames of each scene to include the identified features plus the feature corresponding to the selection. The cropping calculator 362 can iterate through the frames of each scene to crop each frame to include the identified feature and the feature corresponding to the selection. The cropping calculator 362. In some implementations, the cropping calculator 362 can use the motion vector determined using motion analysis for the features to crop each frame. In some implementations, the media is regenerated to be in the target aspect ratio. In some implementations, the signal fusing calculator 360 can assign weights to the different outputs of the analyzers. The signal fusing calculator 360 may normalize the different outputs through a specified range to values that have been determined by a deep learning method.

In some implementations, the functionalities of the signal fusing calculator 360 and the cropping calculator 362 may be iteratively repeated. Subsequent to one or more croppings of the media, the signal fusing calculator 360 and the cropping calculator 362. In some implementations, the cropping calculator 362 can determine the initial subset region of each cropped frame excludes the one or more selected features. Based on the determination, the cropping calculator 362 can change or modify the initial subset region of the cropped frame to include the one or more selected features to generate a new subset region. In some implementations, the cropping calculator 362 can generate or recalculate a score for each feature identified in the frame in the manner described above. For the feature corresponding to the selection received via the selection interface 352, the cropping calculator 362 can assign a higher score than the scores of the one or more features identified without the selection interface 352. The cropping calculator 362 can also identify a subset of the features with the highest subset scores for each scene. Once identified, the cropping calculator 362 can re-crop the frames of each scene to include the identified features plus the feature corresponding to the selection. This process may be iteratively repeated. In each run, the selection of the features may differ, resulting in a different cropping of the frames of the media.

Figure 4:
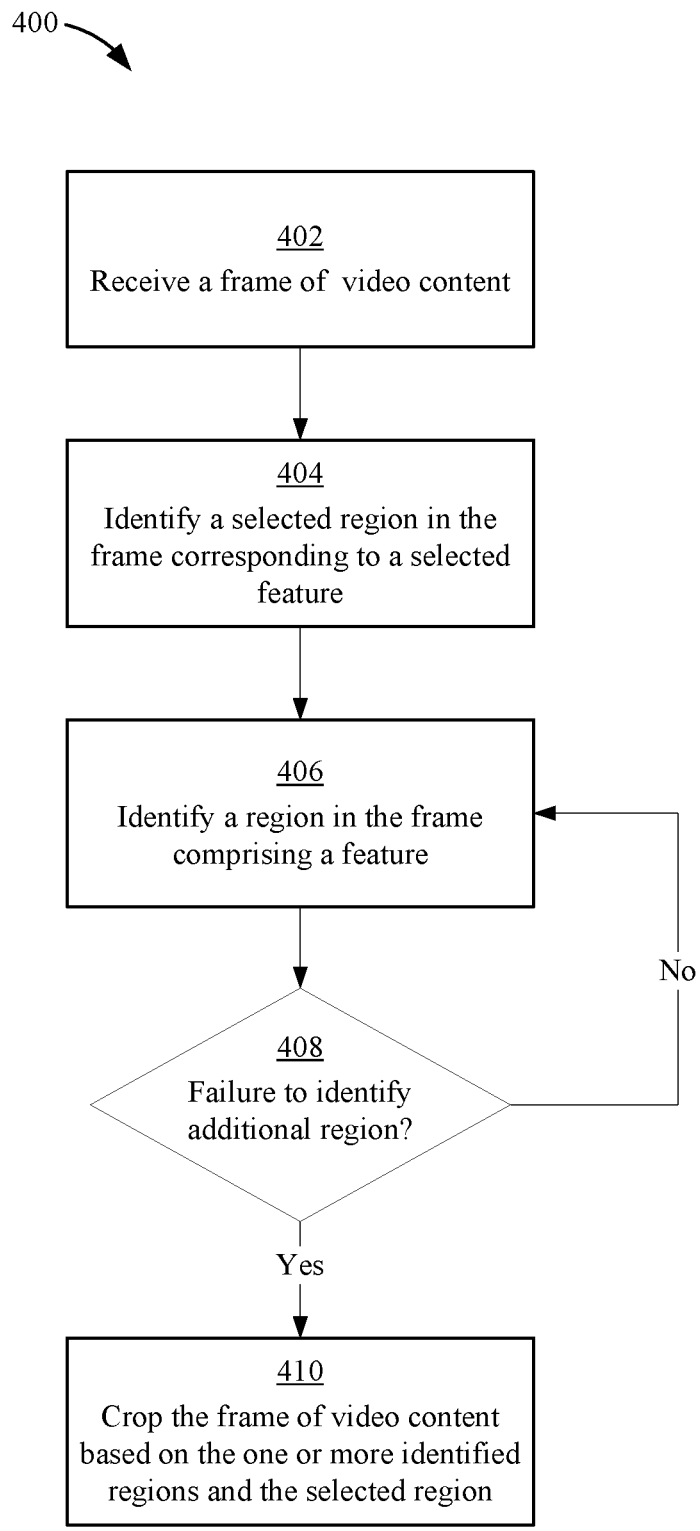
FIG. 4 is a flow diagram depicting an implementation of a method of cropping a frame of media.

FIG. 4 is a flow diagram of an implementation of a method 400 of cropping a frame of media. In some implementations, method 400 is implemented by a processor 142 of a media server system 104 executing instructions stored on data storage 144 and may use media extracted from a media content database 154. In brief, the method 400 can include receiving a frame of media at 402, identifying a selected region in the frame corresponding to a selected feature at 404, and identifying a region in the frame comprising a feature at 406. If an additional region is identified at 408, the method returns to identifying a region in the frame comprising a feature at 406. If there is a failure to identify a region at 408, the method continues cropping the frame of media based on the one or more regions identified at 410.

Still referring to FIG. 4 and in more detail, method 400 may begin when a frame of media is received at 402. In some implementations, the media may include a media file containing a plurality of frames of media (e.g., a video file). The media may be stored in a media content database 154 or retrieved over a network interface 146. In some implementations, the frame of media is received as part of streaming media data. The streaming media may be received over the network interface 146. In some implementations, the frame of media is part of a list of stored media and each media is taken in turn to be processed. In some implementations, a determination is first made whether the media needs to be cropped and/or processed. The determination may be done by comparing the stored dimensions, aspect ratio, resolution, etc., of the stored media with the target values.

A selected region in the frame corresponding to a selected feature may be identified at 404. Using various image recognition algorithms, the selected feature may be identified based on a coordinate, a bounding area, or a feature identifier received via a selection interface. In some implementations, the selected feature may be identified by analyzing the frame for any objects or features near or on the selected coordinate. In some implementations, the selected feature may be identified by analyzing the frame within the bounding area for any objects or features therein. In some implementations, the selected feature may be identified by determining one or more keywords associated with the features detected within the entirety of the frame that corresponds to the feature identifier. Once the selected feature corresponding to the selection data received via the interface is identified, the selected region associated with the selected feature may be identified.

A region in the frame comprising a feature may be identified at 406. In some implementations, the feature is identified by analyzing the frame using facial recognition. In some implementations, the feature is identified by analyzing the frame for text using optical character recognition. In some implementations, the feature is identified by analyzing the frame for objects (e.g., automobiles, buildings, people, animals, street signs, and the like), using object recognition. In some implementations, the feature is identified by analyzing the frame for borders, frames, and/or padding (e.g., a border of uniform or near uniform color at one or more edges of the frame). In some implementations, the frame is analyzed to identify a plurality of features. The features may be of different types (e.g., faces, text, objects, etc.). If there is not a failure to identify an additional region at 408, the method returns to identifying an additional region in the frame comprising a feature at 406.

If there is a failure to identify an additional region at 408, the frame of media may be cropped based on the one or more regions identified from 406 and the selected region identified from 404 at 410. In some implementations, the frame of media may be cropped if one or more values of a target aspect ratio are smaller than the current values of the aspect ratio of the frame of media. In some implementations, the frame of media may be cropped if one or more values of a target resolution are smaller than the current values of the resolution of the frame of media. In some implementations, the frame of media is cropped to match a target aspect ratio or to match a target resolution. Additional padding may be added to one or more sides of the cropped frame of media to match the target aspect ratio or to match the target resolution. In some implementations, the cropped area is further based on one or more of frames of media preceding and/or following the frame of media.

In some implementations, some padding may be added to meet the target aspect ratio during cropping. In some implementations, if there are static borders on one or edges of the frame of media they can be moved or reformatted to form and/or be a part of the padding. In some implementations, additional overlay images may be added to the cropped frame. The additional overlay images may be received via a graphical user interface.

In some implementations, a plurality of frames of media may be received and the plurality of frames of media may be analyzed to determine scene changes. Key point detection may be used to analyze when there is a large change in the key points indicating a scene break or a change in scene. In some implementations, a comparison of all pixels in one frame is compared to the pixels in a successive frame and if more than a certain threshold of pixels is different when considered as part of an optical flow, it is an indication of a scene change. In some implementations, a motion vector is calculated between a plurality of frames of media and a lack of a coherent motion vector between successive frames indicates a scene change. Features may then be identified within a particular scene and the regions containing the particular features tracked among the plurality of frames of media within a particular scene. In implementations, the information of where the particular features are tracked within the plurality of frames of media is also used to determine where to crop the frame of media based on the region.

In some implementations, a plurality of frames of media are received and the plurality of frames of media are analyzed to identify facial features. Face tracking may then be implemented by tracking the facial features to matching facial features in each of the plurality of frames of media.

In some implementations, a plurality of frames of media may be received and the plurality of frames of media may be analyzed to look for static borders along the edges of the plurality of frames. In some implementations, to locate borders, random pixels are selected and lines of pixels vertically and/or horizontally are compared to the random pixels to determine if there are unbroken lines of pixels that are close in color to the randomly selected pixels. In some implementations, borders are located that are static from one frame to the next and contain pixels that are relatively uniform in color. In some implementations, borders can be located that are static from one frame to the next and contain pixel that are relatively uniform in color, but also contain some additional static information such as text embedded in the border that is of a different color. Once a border is located, whether or not it contains embedded text, it can be treated during the processing of the cropping as an image.

Figure 5:
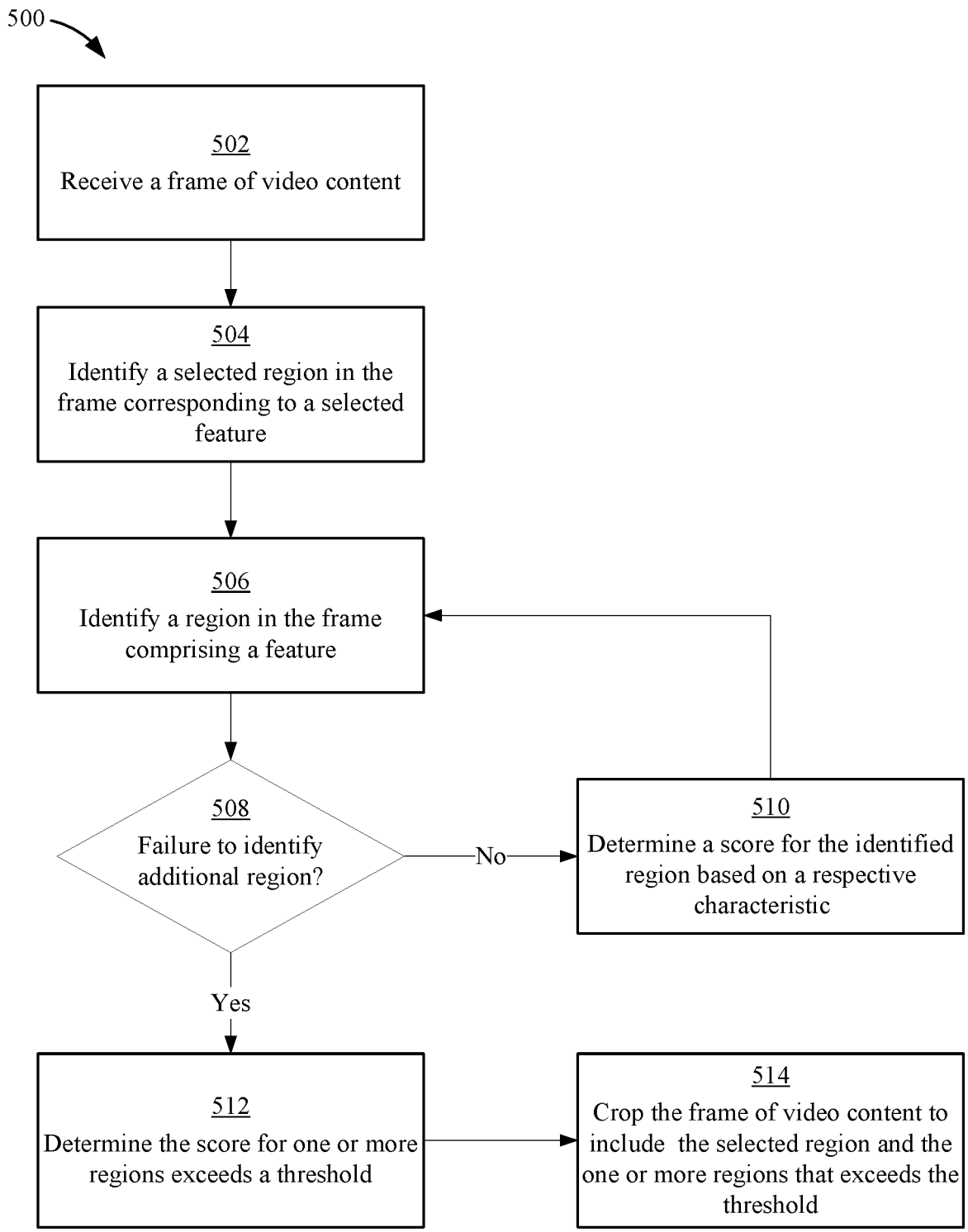
FIG. 5 is a flow diagram depicting an implementation of a method of cropping a frame of media by determining a score for each of a plurality of regions.

FIG. 5 is a flow diagram of an implementation of a method 500 of cropping a frame of media by determining a score for each of a plurality of regions. In some implementations, method 400 is implemented by a processor 142 of a media server system 104 executing instructions stored on data storage 144 and may use media extracted from a media content database 154. In brief, the method 500 can include receiving a frame of media at 502 and identifying a region in the frame comprising a feature at 504. If an additional region is identified at 506, the method determines a score for the identified region based on a respective characteristic at 508 and returns to identifying a region in the frame comprising a feature at 504. If there is a failure to identify a region at 506, the method continues by determining the score for one or more of the identified regions exceeds a threshold at 510, and cropping the frame of media to include one or more regions that exceeds a threshold at 512.

Still referring to FIG. 5 and in more detail, the method 500 may begin when a frame of media is received at 502. In some implementations, the media may include a media file containing a plurality of frames of media (e.g., a video file). The media may be stored in a media content database 154 or retrieved over a network interface 146. In some implementations, the frame of media is received as part of streaming media data. The streaming media may be received over the network interface 146.

A selected region in the frame corresponding to a selected feature may be identified at 504. Using various image recognition algorithms, the selected feature may be identified based on a coordinate, a bounding area, or a feature identifier received via a selection interface. In some implementations, the selected feature may be identified by analyzing the frame for any objects or features near or on the selected coordinate. In some implementations, the selected feature may be identified by analyzing the frame within the bounding area for any objects or features therein. In some implementations, the selected feature may be identified by determining one or more keywords associated with the features detected within the entirety of the frame that corresponds to the feature identifier. Once the selected feature corresponding to the selection data received via the interface is identified, the selected region associated with the selected feature may be identified.

A region in the frame, comprising a feature, is identified at 506. In some implementations, one or more of the features in the region are identified by analyzing the frame using facial recognition. In some implementations, one or more of the features in the region are identified by analyzing the frame for text using optical character recognition. In some implementations, one or more of the features in the region are identified by analyzing the frame for objects (e.g., automobiles, buildings, people, animals, street signs, and the like), using object recognition. In some implementations, one or more of the features in the region are identified by analyzing the frame for borders, frames, and/or padding (e.g., a border of uniform or near uniform color at one or more edges of the frame). In some implementations, each region is further analyzed to potentially identify a plurality of features in one or more of the regions. The features in each of the plurality of regions may be of different types (e.g., faces, text, objects, etc.). If there is not a failure to identify an additional region at 508, the method determines a score for the identified region based on a respective characteristic at 510 and returns to identifying an additional region in the frame comprising a feature at 506.

A score for the identified regions, based on a respective characteristic, is determined at 510. In some implementations, the scores are based on the type of feature that is located in the region or at least partially in the region. In some implementations, the scores are weighted based on the type of feature that is located in the region. The weighting may be determined through the use of training data. In some implementations, the training data may be used as an input to a deep learning inference model. In some implementations, the training data is data input based on the selection of important regions of media. Some characteristics the score may be based on may include size of the feature in the region, type of feature in the region, motion of feature in the region, relative motion of the feature in the region, an amount of blurriness associated with the region, an amount of blurriness associated with a feature in the region, and the like. In some implementations, the scores are assigned to the features instead of the regions containing the features. In some implementations, determining a score for each of the plurality of regions can include determining a ranking of the plurality of regions with at least determining a top ranked region of the plurality of regions. In some implementations, determining a score for each of the plurality of regions can include ranking each of the plurality of regions from highest to lowest, where the higher ranked regions are more likely to be included in any cropping of the frame of media. In some implementations, the scores may be based on a distance between the features identified in 506 to the selected feature identified in 504. In some implementations, the scores may be based on a distance between the features previously identified to the selected feature identified in 904. For the feature corresponding to the selection received via the selection interface, a higher score than the scores of the one or more features identified without the selection interface can be assigned. In some implementations, a distance between a feature and the feature corresponding to the selection can be determined for each feature previously identified. Based on the distance and the characteristics of the feature, the score can be generated for the identified feature. In some implementations, the closer the distance, the higher the score may be; and the further the distance, the lower the score may be. In other implementations, scores may be reversed (e.g. with a lower score indicating higher salience or relevance). In some implementations, the score-to-distance relationship may be linear, while in other implementations, it may be non-linear (e.g. stepwise, piecewise linear, geometric, exponential, etc.). The score for the selected feature may be set to a predetermined margin over the highest score among the other features identified in the frames.

If there is a failure to identify an additional region at 508, the method determines the score for one or more regions exceeds a threshold at 512. In some implementations, the scores for each of the plurality of regions comprise values for comparison. In some implementations, the score for a region must exceed a threshold value before the region is taken into consideration when cropping the frame of media. In some implementations, only the region with the highest score is prioritized to be included when cropping the frame of media. In some implementations, a plurality of regions is prioritized based on their respective scores to be included when cropping the frame of media. In some implementations, a determination is made for which combination of regions results in a maximized score where all regions are able to fit inside the area of the cropped frame of media.

If there is not a failure to identify an additional region at 508, the frame of media is cropped at 514 to include the selected region identified in 504 and the one or more regions identified in 506 with an associated score that exceeds a threshold. In some implementations, a determination only the regions of the plurality of regions with scores that exceed a threshold value are considered when determining the region to include when cropping the frame of media. In some implementations, the frame of media may be cropped if one or more values of a target aspect ratio are smaller than the current values of the aspect ratio of the frame of media. In some implementations, the frame of media may be cropped if one or more values of a target resolution are smaller than the current values of the resolution of the frame of media. In some implementations, the frame of media is cropped to match a target aspect ratio or to match a target resolution. Additional padding may be added to one or more sides of the cropped frame of media to match the target aspect ratio or to match the target resolution. In some implementations, the cropped area is further based on one or more of frames of media preceding and/or following the frame of media.

Figure 6:
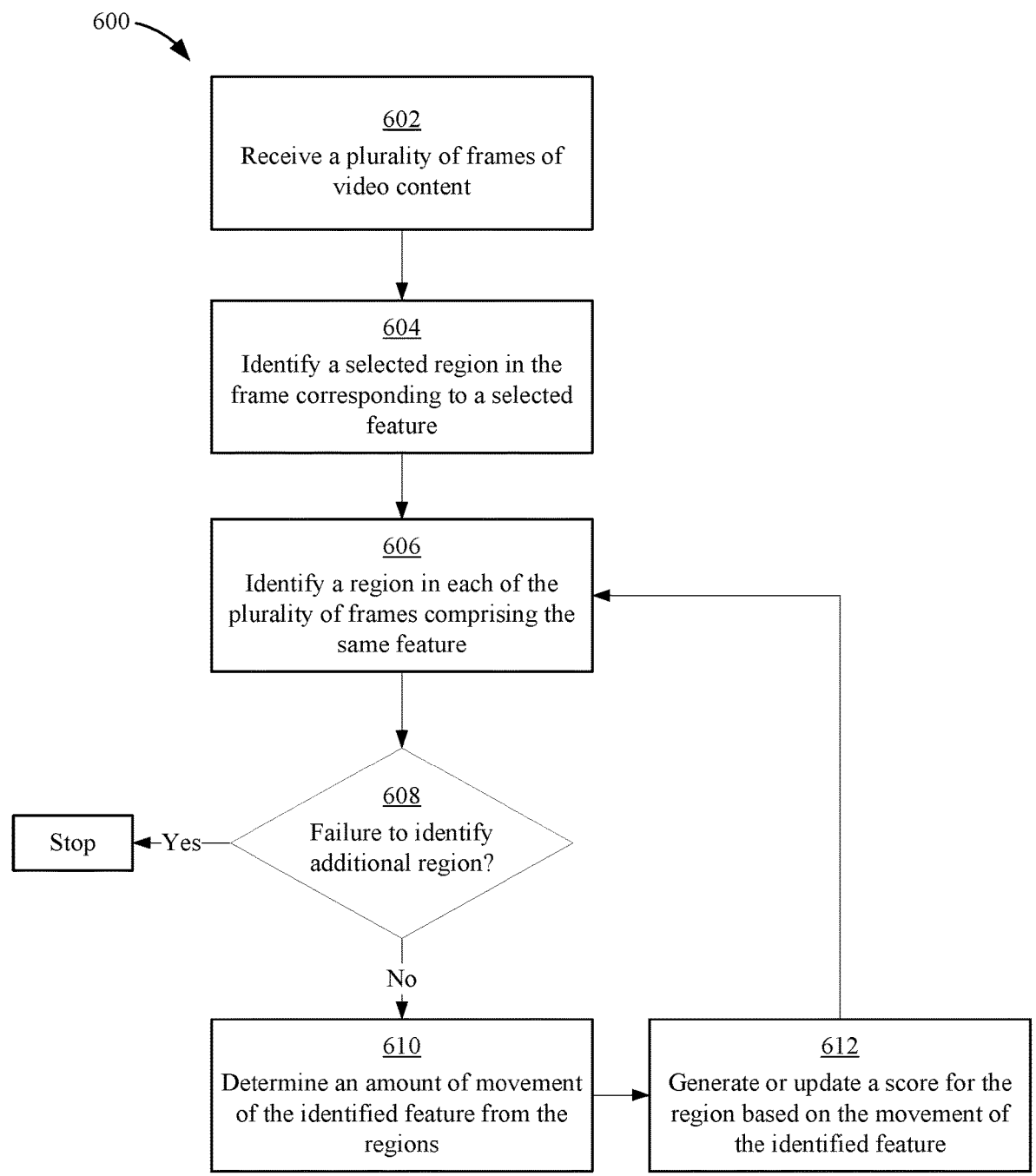
FIG. 6 is a flow diagram depicting an implementation of a method of generating or updating a score based on movement of a feature.

FIG. 6 is a flow diagram of an implementation of a method 600 of generating or updating a score based on movement of a feature. In some implementations, method 600 is implemented by a processor 142 of a media server system 104 executing instructions stored on data storage 144 and may use media extracted from a media content database 154. In brief, the method 600 can include receiving a plurality of frames of media at 602 and identifying a region in each of the plurality of frames comprising the same feature at 606. If there is not a failure to identify additional regions at 608, the method continues by determining an amount of movement of the feature from the regions at 610, and generating or updating a score for the region based on the movement of the feature at 612 before returning to 606 to identify an additional region in each of the plurality of frames comprising the same feature. If there is a failure to identify additional regions at 608, the method stops.

Still referring to FIG. 6 and in more detail, the method 600 may begin when a plurality of frames of media is received at 602. In some implementations, the media is a media file containing the plurality of frames of media (e.g., a video file). The media may be stored in a media content database 154 or retrieved over a network interface 146. In some implementations, the plurality of frames of media may be received as part of streaming media data. The streaming media may be received over the network interface 146.

A selected region in the frame corresponding to a selected feature may be identified at 604. Using various image recognition algorithms, the selected feature may be identified based on a coordinate, a bounding area, or a feature identifier received via a selection interface. In some implementations, the selected feature may be identified by analyzing the frame for any objects or features near or on the selected coordinate. In some implementations, the selected feature may be identified by analyzing the frame within the bounding area for any objects or features therein. In some implementations, the selected feature may be identified by determining one or more keywords associated with the features detected within the entirety of the frame that corresponds to the feature identifier. In some implementations, the selected feature may be identified by analyzing the frame using facial recognition. In some implementations, the selected feature may be identified by analyzing the frame for text using optical character recognition. In some implementations, the selected feature may be identified by analyzing the frame for objects (e.g., automobiles, buildings, people, animals, street signs, and the like), using object recognition. In some implementations, the selected feature may be identified by analyzing the frame for borders, frames, and/or padding (e.g., a border of uniform or near uniform color at one or more edges of the frame). In some implementations, the selected feature may be analyzed to identify a plurality of features. The features may be of different types (e.g., faces, text, objects, etc.). Once the selected feature corresponding to the selection data received via the interface is identified, the selected region associated with the selected feature may be identified.

A region in each of the plurality of frames comprising the same feature is identified at 606. In some implementations, identification of the feature as the same feature can include comparing characteristics of the feature. Characteristics of the feature may include object attributes, color values, size, and the like. In some implementations, identification of the feature as the same feature is also based on proximity of the feature between frames of the plurality of frames preceding and following the frame.

If there is not a failure to identify additional regions at 608, an amount of movement of the feature from the regions is determined at 610. The determination may include the features identified in 604 and 606. In some implementations, the amount of movement of the feature from the regions is determined by the absolute position of the feature within each of the plurality of frames. In some implementations, the amount of movement of the feature from the regions is determined by the relative position of the feature within each of the plurality of frames when compared to one or more of preceding or following frames. In some implementations, the amount of movement is determined by an increase or decrease in size of the feature between one and more of the plurality of frames. A combination of different ways of determining the amount of movement of the feature may be used to determine the amount of movement between two or more of the plurality of frames.

A score for the region, based on the movement of the feature, is generated or updated at 612. In some implementations, the scores are based on or adjusted based on the amount of movement of the feature between two or more frames of the received plurality of frames. In some implementations, the adjustment of the scores is done by weighting existing scores for regions containing one or more features of the frame based on a determined amount of movement between a plurality of frames of the one or more features. In some implementations, the scores are assigned to the features instead of the regions containing the features. In some implementations, determining a score for each of the plurality of regions can include determining a ranking of the plurality of regions with at least determining a top ranked region of the plurality of regions. In some implementations, determining a score for each of the plurality of regions can include ranking each of the plurality of regions from highest to lowest, where the higher ranked regions are more likely to be included in any cropping of the frame of media. In some implementations, the score corresponding to the feature identified in 604 may be set to a higher value than the scores corresponding to the features identified in 606.

The conversion of media that includes detection of parts of the image or video (e.g., features) for each frame that are important and the intelligent cropping or padding to retain important features while discarding unimportant regions, static borders, etc., may be performed on different computing systems. In some implementations, the detection of parts of the image, video, or other media may be done on a server system and used to create metadata associating the areas or bounds containing features with the frames of the media. Based on the identified important areas, the image or video may be intelligently cropped or padded to retain important features while discarding unimportant regions, static borders, etc. on another device, such as a mobile device. Features detected may include face tracking, object detection and/or recognition, text detection, detection of dominant colors, motion analysis, scene change detection, and image saliency. Detection and recognition can use methods and algorithms that are deep learning based. Text detection may use optical character recognition (OCR). Detection of features to place in the metadata allows for an optimal cropping path to be executed on the mobile device. Other aspects of the invention may include padding the image to match the background color and removing and/or reformatting any borders to fit the new display mode. Although the media primarily discussed in terms of video, in many implementations the systems may be applied to individual images or frames.

Figure 7:
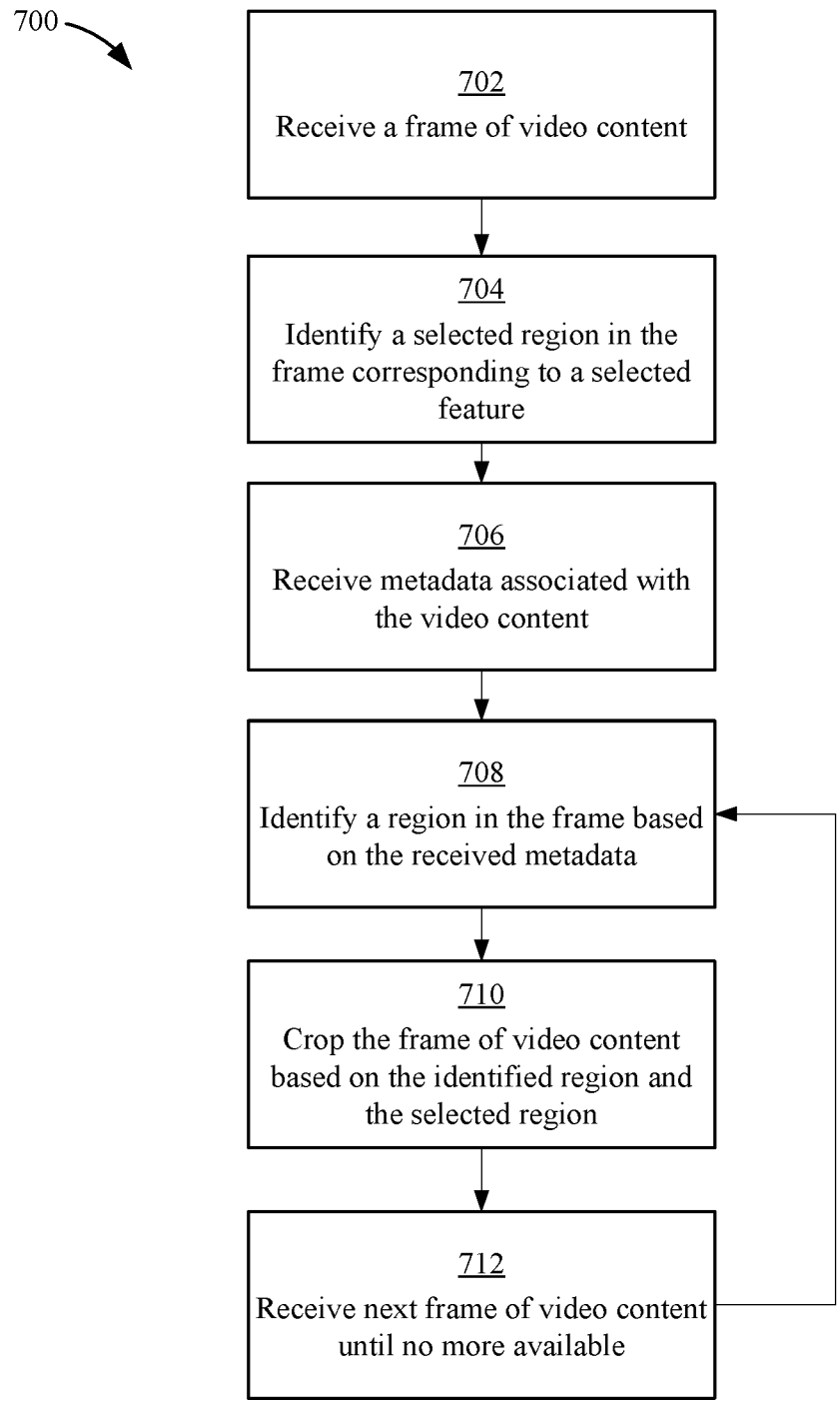
FIG. 7 is a flow diagram depicting an implementation of a method of cropping a frame of media using received metadata.

FIG. 7 is a flow diagram of an implementation of a method 700 of cropping a frame of media using received metadata. In some implementations, method 700 is implemented by a processor 122 of a mobile device 102 executing instructions stored on data storage 124. In brief, the method 700 can include receiving a frame of media at 702, receiving metadata associated with the media at 706, identifying a region in the frame based on the received metadata at 708, cropping the frame of media based on the region at 710, and receiving the next frame of media at 712.

Still referring to FIG. 7 and in more detail, the method 700 may begin when a frame of media is received at 702. In some implementations, the media is a media file containing a plurality of frames of media (e.g., a video file). The media may be received over a network interface 126 and stored in data storage 124. In some implementations, the frame of media is received as part of streaming media data. The streaming media may be received over the network interface 146.

A selected region in the frame corresponding to a selected feature may be identified at 704. Using various image recognition algorithms, the selected feature may be identified based on a coordinate, a bounding area, or a feature identifier received via a selection interface. In some implementations, the selected feature may be identified by analyzing the frame for any objects or features near or on the selected coordinate. In some implementations, the selected feature may be identified by analyzing the frame within the bounding area for any objects or features therein. In some implementations, the selected feature may be identified by determining one or more keywords associated with the features detected within the entirety of the frame that corresponds to the feature identifier. In some implementations, the selected feature may be identified by finding the metadata and the feature associated with the metadata within the entirety of the frame that corresponds to the feature identifier. Once the selected feature corresponding to the selection data received via the interface is identified, the selected region associated with the selected feature may be identified.

The metadata associated with the media is received at 706. In some implementations, the metadata is received as part of the media file containing a plurality of frames of media. In some implementations, the metadata is received independently, along with an identifier or other data associating the metadata with the received plurality of frames of media. In some implementations, the metadata may include data related to regions associated with one or more of the plurality of frames of media. In some implementations, bounding information of one or more regions for each of the plurality of frames of media is included in the metadata. In some implementations, locations within each of the plurality of frames of media of one or more features may be contained in the metadata. Features may include objects such as automobiles, buildings, people, animals, street signs, and the like, text, borders of the frame of media, uniform color padding of one or more sides of the frame of media, etc. In some implementations, the metadata may identify a plurality of features and/or regions of one or more of the plurality of frames of media. In some implementations, the metadata is associated with a target aspect ratio or a target resolution. The metadata may, in some implementations, identify one or more regions of frames of the media. Each of the one or more identified regions may be regions determined to have a score that exceeds a threshold. The score may be determined by a cropping calculator as described above.

A region in the frame, based on the received metadata, is identified at 708. In some implementations, the region in the frame may be retrieved from the metadata and may include a feature identified through the use of facial recognition. In some implementations, the region in the frame may be retrieved from the metadata and may include a feature identified by analyzing the frame for text using optical character recognition. In some implementations, the region in the frame is retrieved from the metadata and may include a feature identified by analyzing the frame for objects (e.g., automobiles, buildings, people, animals, street signs, and the like), using object recognition. In some implementations, the region in the frame is retrieved from the metadata and may include a feature identified by analyzing the frame for borders, frames, and/or padding (e.g., a border of uniform or near uniform color at one or more edges of the frame). In some implementations, the region in the frame may be retrieved from the metadata and may include a plurality of features. The features may be of different types (e.g., faces, text, objects, etc.). In some implementations, a plurality of regions may be retrieved from the metadata for the frame of media. In some implementations, a plurality of frames of media may be received and the metadata is associated with the plurality of frames of media.

The frame of media is cropped at 710 based on the region identified in 708 and the selected region identified in 704. In some implementations, the frame of media may be cropped if one or more values of a target aspect ratio are smaller than the current values of the aspect ratio of the frame of media. In some implementations, the frame of media may be cropped if one or more values of a target resolution are smaller than the current values of the resolution of the frame of media. In some implementations, the frame of media is cropped to match a target aspect ratio or to match a target resolution. The target aspect ratio or target resolution may change depending on the orientation of a mobile device 102 displaying the frame of media. Additional padding may be added to one or more sides of the cropped frame of media to match the target aspect ratio or to match the target resolution. In some implementations, the cropped area is further based on one or more of frames of media preceding and/or following the frame of media.

The next frame of media is received at 712 until no more frames are available. The next frame of media may be received over a network interface 126 and stored in data storage 124. In some implementations, the next frame of media is received as part of streaming media data. The streaming media may be received over the network interface 146. As long as there are more frames available, the method may continue by again moving on to identify a region in the next frame based on the received metadata.

Figure 8:
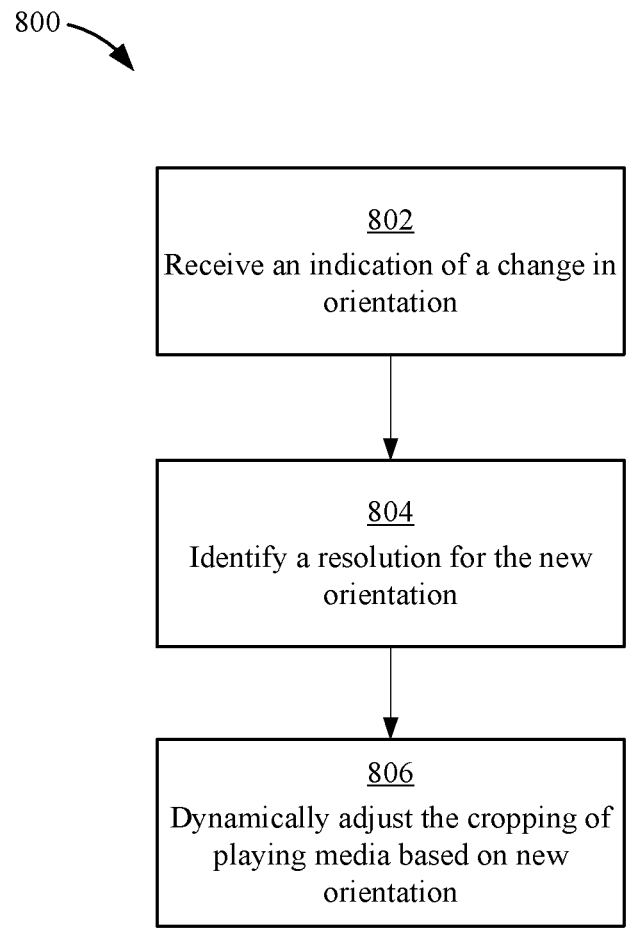
FIG. 8 is a flow diagram depicting an implementation of a method of adjusting cropping based on a change in orientation.

FIG. 8 is a flow diagram of an implementation of a method 800 of adjusting cropping based on a change in orientation. In some implementations, method 800 is implemented by a processor 122 of a mobile device 102 executing instructions stored on data storage 124 and receiving data from one or more sensor modules 132. In brief, the method 800 can include receiving an indication of a change in orientation at 802, identifying a resolution for the new orientation at 804, and dynamically adjusting the cropping of playing media based on the new orientation at 806.

Still referring to FIG. 8 and in more detail, the method 800 may begin when an indication of a change in orientation is received at 802. In some implementations, the indication of a change in orientation is received from a sensor module 132

(e.g., an accelerometer and/or magnetometer). In some implementations, the change in orientation or detection of orientation occurs prior to the display of media. In some implementations, the change in orientation occurs during the display of media, and a change to the display of media occurs in real time following the detection of the change in orientation.

A resolution and/or aspect ratio for the new orientation is identified at 804. In some implementations, the resolution and/or aspect ratio is predetermined by an application displaying the media. The resolution and/or aspect ratio may have predetermined values for both a landscape and portrait orientation. In some implementations, the resolution and/or aspect ratio depending on orientation, is determined to minimize the amount of unused display space. In some implementations, the resolution and/or aspect ratio depending on orientation, is determined to minimize the amount of padding needed to fit the displayed media in the available display space.

The cropping of playing media is dynamically adjusted at 806 based on the new orientation. In some implementations, the change in orientation occurs during the display of media, and a change to the display of media occurs in real time following the detection of the change in orientation. In some implementations, the frame of media or the plurality of frames of media remain the same, but the cropping is altered based on received metadata to fit in the new resolution and/or aspect ratio.

Figure 9:
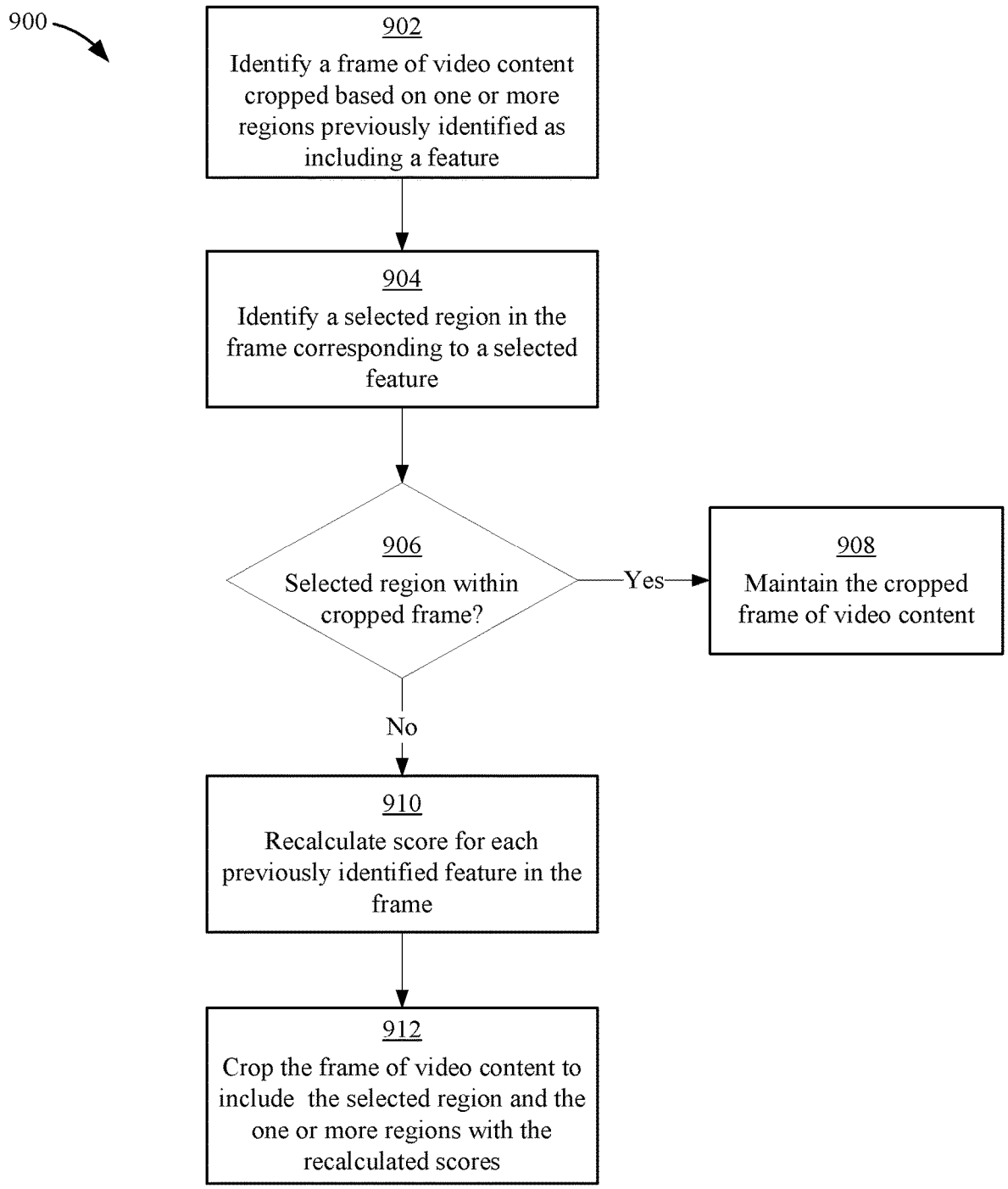
FIG. 9 is a flow diagram depicting an implementation of a method of iteratively cropping a frame of media using selection data.

FIG. 9 is a flow diagram of an implementation of a method 900 of iteratively cropping a frame of media using selection data. In some implementations, method 900 is implemented by a processor 142 of a media server system 104 executing instructions stored on data storage 144 and may use media extracted from a media content database 154. In brief, the method 900 can include: identifying a frame of media cropped based on the one or more regions previously identified as including a feature at 902, identifying a selected region in the frame corresponding to a selected feature at 904, and determining whether the selection region is within the cropped frame at 906. If the selected region is determined to be within the cropped frame at 906, the method 800 may include maintaining the cropped frame of media. Otherwise, if the selected region is determined to be outside the cropped frame at 906, the method may include recalculating the score for each previously identified feature in the frame at 910 and cropping the frame of media based on the selected region and the one or more regions with the recalculated scores at 912.

In more detail, the method 900 may begin by identifying a frame of media cropped based on the one or more regions previously identified as including a feature at 902. In some implementations, each frame belonging to a scene may have been cropped based on the one or more features previously identified therein. The one or more features may have been identified using various image analysis techniques, such as facial recognition, optical character recognition, object recognition, and other algorithms. In some implementations, the previous cropping may have been done without any selection data from a selection interface.

A selected region in the frame corresponding to a selected feature may be identified at 904. Using various image recognition algorithms, the selected feature may be identified based on a coordinate, a bounding area, or a feature identifier received via a selection interface. In some implementations, the selected feature may be identified by analyzing the frame for any objects or features near or on the selected coordinate. In some implementations, the selected feature may be identified by analyzing the frame within the bounding area for any objects or features therein. In some implementations, the selected feature may be identified by determining one or more keywords associated with the features detected within the entirety of the frame that corresponds to the feature identifier. Once the selected feature corresponding to the selection data received via the interface is identified, the selected region associated with the selected feature may be identified.

Whether the selected region is within the cropped frame may be determined at 906.

Whether the selected region identified from the selected coordinate, bounding area, or feature identifier overlaps or is otherwise included within the cropped frame may be determined. In some implementations, if a threshold percentage (e.g., 50-100%) of the selected region overlaps with the cropped frame, the selected region may be determined to be within the cropped frame. In some implementations, if the selected coordinate used to identify the selected region is within the cropped frame, the selected region may be determined to be within the cropped frame. The selected coordinate may be translated relate to a proportion between the full-sized frame and the cropped frame. In some implementations, if the threshold percentage (e.g., 50-100%) of the selected region does not overlap with the cropped frame, the selected region may be determined to be outside the cropped frame. In some implementations, if the selected coordinate used to identify the selected region is outside the cropped frame, the selected region may be determined to be outside the cropped frame.

If the selected region is determined to be within the cropped frame at 906, the cropped frame of the media may be maintained at 908. On the other hand, if the selected region is determined to be outside the cropped frame at 906, the score for each previously identified feature in the frame may be recalculated at 910. In some implementations, the scores may be based on the type of feature that is located in the region or at least partially in the region. In some implementations, the scores may be weighted based on the type of feature that is located in the region. The weighting may be determined through the use of training data. In some implementations, the training data may be used as an input to a deep learning inference model. In some implementations, the training data is data input based on the selection of important regions of media. Some characteristics the score may be based on may include size of the feature in the region, type of feature in the region, motion of feature in the region, relative motion of the feature in the region, an amount of blurriness associated with the region, an amount of blurriness associated with a feature in the region, and the like. In some implementations, the scores are assigned to the features instead of the regions containing the features. In some implementations, determining a score for each of the plurality of regions can include determining a ranking of the plurality of regions with at least determining a top ranked region of the plurality of regions. In some implementations, determining a score for each of the plurality of regions can include ranking each of the plurality of regions from highest to lowest, where the higher ranked regions are more likely to be included in any cropping of the frame of media.

In some implementations, the scores may be based on a distance between the features previously identified to the selected feature identified in 904. For the feature corresponding to the selection received via the selection interface, a higher score than the scores of the one or more features identified without the selection interface can be assigned. In some implementations, a distance between a feature and the feature corresponding to the selection can be determined for each feature previously identified. Based on the distance and the characteristics of the feature, the score can be generated for the identified feature. In some implementations, the closer the distance, the higher the score may be; and the further the distance, the lower the score may be. In other implementations, scores may be reversed (e.g. with a lower score indicating higher salience or relevance). In some implementations, the score-to-distance relationship may be linear, while in other implementations, it may be non-linear (e.g. stepwise, piecewise linear, geometric, exponential, etc.). The score for the selected feature may be set to a predetermined margin over the highest score among the other features identified in the frames.

The frame of media may be cropped to include the one or more regions previously identified and the selected region identified from 904 based on the recalculated scores at 910. In some implementations, the frame of media may be cropped if one or more values of a target aspect ratio are smaller than the current values of the aspect ratio of the frame of media. In some implementations, the frame of media may be cropped if one or more values of a target resolution are smaller than the current values of the resolution of the frame of media. In some implementations, the frame of media is cropped to match a target aspect ratio or to match a target resolution. Additional padding may be added to one or more sides of the cropped frame of media to match the target aspect ratio or to match the target resolution. In some implementations, the cropped area is further based on one or more of frames of media preceding and/or following the frame of media.

Figure 10:
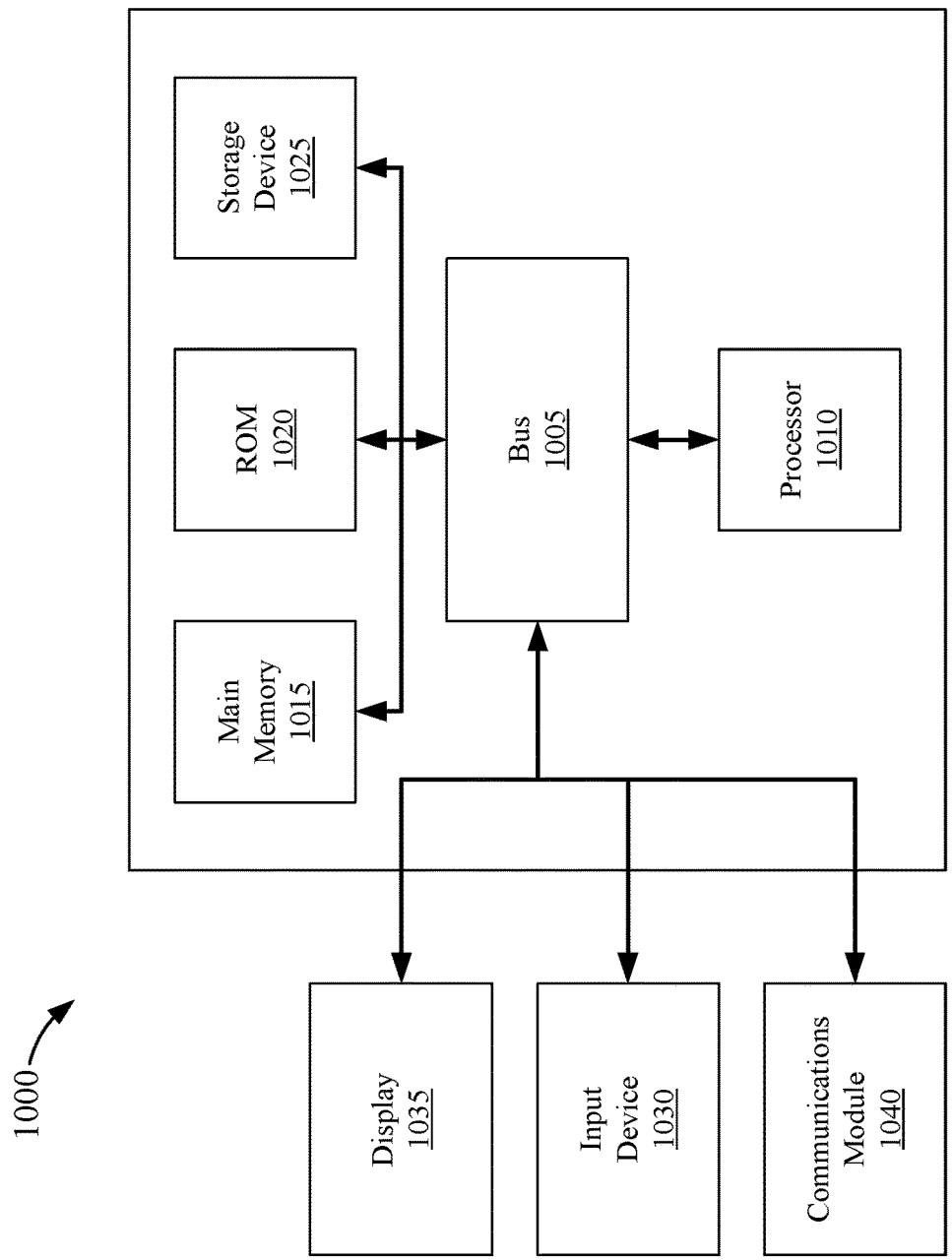
FIG. 10 is a block diagram depicting a general architecture for a computing system that may be employed to implement various elements of the systems and methods described and illustrated herein.

FIG. 10 is a block diagram of a general architecture for a computing system 900 that can be used to implement the mobile devices 102, media server systems 104, etc. The computing system 900 includes a bus 1005 or other communication component for communicating information and a processor 1010 coupled to the bus 1005 for processing information. The computing system 1000 can also include one or more processors 1010 coupled to the bus for processing information. The computing system 1000 also includes main memory 1015, such as a RAM or other dynamic storage device, coupled to the bus 1005 for storing information, and instructions to be executed by the processor 1010. Main memory 1015 can also be used for storing position information, temporary variables, or other intermediate information during execution of instructions by the processor 1010. The computing system 1000 may further include a ROM 1020 or other static storage device coupled to the bus 1005 for storing static information and instructions for the processor 1010. A storage device 1025, such as a solid state device, magnetic disk or optical disk, is coupled to the bus 1005 for persistently storing information and instructions. Computing system 1000 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 1000 may be coupled via the bus 1005 to a display 1035, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 1030, such as a keyboard including alphanumeric and other keys, may be coupled to the bus 1005 for communicating information and command selections to the processor 1010. In another implementation, the input device 1030 may be integrated with the display 1035, such as in a touch screen display. The input device 1030 can include a cursor control, such as a mouse, a trackball, or cursor direction keys, for communicating direction information and command selections to the processor 1010 and for controlling cursor movement on the display 1035.

According to various implementations, the processes and/or methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes and/or method steps described herein. One or more processors in a multi-processing arrangement may also be employed to execute the instructions contained in main memory 1015. In alternative implementations, hard-wired circuitry may be used in place of or in combination with software instructions to effect illustrative implementations. Thus, implementations are not limited to any specific combination of hardware circuitry and software.

Although an implementation of a computing system 1000 has been described in FIG. 10, implementations of the subject matter and the functional operations described in this specification can be implemented in other types of digital electronic circuitry, or in computer software, firmware, or hardware, including the structures disclosed in this specification and their structural equivalents, or in combinations of one or more of them.

At least one aspect of the present disclosure is directed to a method of converting media dimensions. A temporal analyzer executing on a computing device may identify a set of frames from a video in a first orientation as belonging to a scene. A focus region analyzer executing on the computing device may receive, via a user interface, a selected coordinate on a frame of the set of frames identified as belonging to the scene. An image analyzer executing on the computing device may identify a first region within the frame comprising a first feature corresponding to the selected coordinate. The image analyzer may identify, within the frame a second region comprising a second feature. A cropping calculator executing on the computing device may generate, a first score for the first feature, a second score for the second feature. The first score may be greater than the second score based on the first feature corresponding to the selected coordinate. The cropping calculator may determine that the second score exceeds a threshold. An image processor executing on the computing device may crop, responsive to the determination, the frame of the set of frames identified as belonging to the scene to include the first region and the second region within a predetermined display area comprising a subset region of the frame in a second orientation.

In some implementations, the image processor may identify an initial subset region of the frame in the second orientation including the second region including the second feature and a third region including a third feature. In some implementations, the image processor may determine that the initial subset region excludes the first region including the first feature corresponding to the selected coordinate. In some implementations, the image processor may modify the initial subset region of the frame to include the first region comprising the first feature and the second region comprising the second feature to generate the subset region of the frame in the second orientation, responsive to determining that the initial subset region excludes the first region.

In some implementations, the image analyzer may identify, for each frame belonging to the scene, the first region and the second region comprising the first feature and the second feature within the frame. In some implementations, cropping may further include cropping, responsive to the identification of the first region and the second region in each frame of the set of frames, the frame to include the first region and the second region within the predetermined display area comprising the subset region of the frame in the second orientation.

In some implementations, wherein receiving the selected coordinate on the frame may further include receiving, via the user interface, a bounding box on the frame of set of frames identified as belonging to the scene. In some implementations, identifying the first region may further include identifying the first region comprising the first feature based on the bounding box selected using the user interface.

In some implementations, receiving the selected coordinate on the frame may further include receiving, via the user interface, a second selected coordinate on the frame. In some implementations, the image analyzer may identify, within the frame, a fourth region comprising a fourth feature corresponding to the second selected coordinate. In some implementations, the temporal analyzer may determine, between the frame and a second frame of the set of frames identified as belonging to the scene, a motion vector for the fourth feature. In some implementations, the image processor may crop the second frame of the set of frames identified as belonging to the scene based on the motion vector for the fourth feature.

In some implementations, the focus region analyzer may receive, via the user interface, a second selected coordinate on the frame of the subset of frames, subsequent to cropping the frame. In some implementations, the image analyzer may adjust the first region to generate a fourth region comprising the first feature corresponding to the second selected coordinate. In some implementations, the cropping calculator may generate a fourth score for the first feature, a fifth score for the second feature, and a sixth score for a third feature, the sixth score greater than the fifth score based on a first distance between the second selected coordinate and the second feature and a second distance between the second selected coordinate and the third feature. In some implementations, the image processor may crop the frame to include a third region corresponding to the third feature and the fourth region within a second predetermined display area comprising a second subset region of the frame in the second orientation.

In some implementations, the focus region analyzer may receive, via the user interface, a feature identifier for a second frame of the set of frames identified as belonging to the scene. In some implementations, the image analyzer may identify, within the second frame a fourth region comprising a fourth feature corresponding to the feature analyzer using a semantic knowledge graph. In some implementations, the image analyzer may identify, within the second frame a fifth region comprising a fifth feature. In some implementations, the cropping calculator may generate a fourth score for the fourth feature, a fifth score for the fifth feature, the fourth score greater than the fifth score based on the fourth feature corresponding to the feature identifier received via the user interface. In some implementations, the image processor may crop the second frame of the set of frames identified as belonging to the scene to include the fourth region and the fifth region within a second predetermined display area comprising a subset region of the second frame in the second orientation.

In some implementations, the focus region analyzer may receive, via the user interface, an overlay image to add to the frame at a specified coordinate. In some implementations, the image processor, subsequent to the cropping of the frame, may add the overly image to the subset region of the frame at the specified coordinate.

In some implementations, the second feature may include text. In some implementations, generating the second score for the second feature may further include generating the second score for the second feature based on at least one of a characteristic of the second feature proportional to a size of the text and a distance of the text from a center of the frame. In some implementations, the second feature comprises a face. In some implementations, generating the second score for the second feature based on a characteristic of the second feature may further include generating the second score based on the size of the face relative to the frame.

At least one aspect of the present disclosure is directed to a system of converting media dimensions. The system may include a temporal analyzer executing on a computing device. The temporal analyzer may identify a set of frames from a video in a first orientation as belonging to a scene. The system may include a focus region analyzer executing on the computing device. The focus region analyzer may receive, via a user interface, a selected coordinate on a frame of the set of frames identified as belonging to the scene. The system may include an image analyzer executing on the computing device. The image analyzer may identify a first region within the frame comprising a first feature corresponding to the selected coordinate. The image analyzer may identify, within the frame a second region comprising a second feature. The system may include a cropping calculator executing on the computing device. The cropping calculator may generate, a first score for the first feature and a second score for the second feature. The first score may be greater than the second score based on the first feature corresponding to the selected coordinate. The cropping calculator may determine that the second score exceeds a threshold. The system may include an image processor executing on the computing device. The image processor may crop, responsive to the determination, the frame of the set of frames identified as belonging to the scene to include the first region and the second region within a predetermined display area comprising a subset region of the frame in a second orientation.

In some implementations, the image processor may identify an initial subset region of the frame in the second orientation including the second region including the second feature and a third region including a third feature. In some implementations, the image processor may determine that the initial subset region excludes the first region including the first feature corresponding to the selected coordinate. In some implementations, the image processor may modify the initial subset region of the frame to include the first region comprising the first feature and the second region comprising the second feature to generate the subset region of the frame in the second orientation, responsive to determining that the initial subset region excludes the first region.

In some implementations, the image analyzer may identify, for each frame belonging to the scene, the first region and the second region comprising the first feature and the second feature within the frame. In some implementations, the image processor may crop, responsive to the identification of the first region and the second region in each frame of the set of frames, the frame to include the first region and the second region within the predetermined display area comprising the subset region of the frame in the second orientation.

In some implementations, the focus region analyzer may further receive, via the user interface, a bounding box on the frame of set of frames identified as belonging to the scene. In some implementations, the image analyzer may identify the first region comprising the first feature based on the bounding box selected using the user interface.

In some implementations, the focus region analyzer may receive, via the user interface, a second selected coordinate on the frame. In some implementations, the image analyzer may identify, within the frame, a fourth region comprising a fourth feature corresponding to the second selected coordinate. In some implementations, the temporal analyzer may determine, between the frame and a second frame of the set of frames identified as belonging to the scene, a motion vector for the fourth feature. In some implementations, the image processor may crop the second frame of the set of frames identified as belonging to the scene based on the motion vector for the fourth feature.

In some implementations, the focus region analyzer may receive, via the user interface, a second selected coordinate on the frame of the subset of frames, subsequent to cropping the frame. In some implementations, the image analyzer may adjust the first region to generate a fourth region comprising the first feature corresponding to the second selected coordinate. In some implementations, the cropping calculator may generate a fourth score for the first feature, a fifth score for the second feature, and a sixth score for a third feature, the sixth score greater than the fifth score based on a first distance between the second selected coordinate and the second feature and a second distance between the second selected coordinate and the third feature. In some implementations, the image processor may crop the frame to include a third region corresponding to third feature and the fourth region within a second predetermined display area comprising a second subset region of the frame in the second orientation.

In some implementations, the focus region analyzer may receive, via the user interface, a feature identifier for a second frame of the set of frames identified as belonging to the scene. In some implementations, the image analyzer may identify, within the second frame a fourth region comprising a fourth feature corresponding to the feature analyzer using a semantic knowledge graph. In some implementations, the image analyzer may identify, within the second frame a fifth region comprising a fifth feature. In some implementations, the cropping calculator may generate a fourth score for the fourth feature, a fifth score for the fifth feature, the fourth score greater than the fifth score based on the fourth feature corresponding to the feature identifier received via the user interface. In some implementations, the image processor may crop the second frame of the set of frames identified as belonging to the scene to include the fourth region and the fifth region within a second predetermined display area comprising a subset region of the second frame in the second orientation.

In some implementations, the focus region analyzer may receive, via the user interface, an overlay image to add to the frame at a specified coordinate. In some implementations, the image processor, subsequent to the cropping of the frame, may add the overly image to the subset region of the frame at the specified coordinate.

In some implementations, the second feature may include text. In some implementations, generating the second score for the second feature may further include generating the second score for the second feature based on at least one of a characteristic of the second feature proportional to a size of the text and a distance of the text from a center of the frame. In some implementations, the second feature comprises a face. In some implementations, generating the second score for the second feature based on a characteristic of the second feature may further include generating the second score based on the size of the face relative to the frame.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including in some implementations a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, in some implementations, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including in some implementations semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; in some implementations, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method of converting media dimensions, comprising:

identifying, by a temporal analyzer executing on a computing device, a set of frames from a video in a first orientation as belonging to a scene;

receiving, by a focus region analyzer executing on the computing device, via a user interface, first and second selected coordinates on a frame of the set of frames identified as belonging to the scene;

identifying, by an image analyzer executing on the computing device, a first region within the frame comprising a first feature corresponding to the first selected coordinate;

identifying, by the image analyzer executing on the computing device, a second region within the frame comprising a second feature;

generating, by a cropping calculator executing on the computing device, a first score for the first feature and a second score for the second feature, the first score greater than the second score based on the first feature corresponding to the first selected coordinate;

determining, by the cropping calculator, that the second score exceeds a threshold;

cropping, by an image processor executing on the computing device, responsive to the determination, the frame of the set of frames identified as belonging to the scene to include the first region and the second region within a predetermined display area comprising a subset region of the frame in a second orientation;

identifying, by the image analyzer, within the frame, a third region comprising a third feature corresponding to the second selected coordinate;

determining, by the temporal analyzer, between the frame and a second frame of the set of frames identified as belonging to the scene, a motion vector for the third feature; and cropping, by the image processor, the second frame of the set of frames identified as belonging to the scene based on the motion vector for the third feature.

2. The method of claim 1, further comprising:

identifying, by the image processor, an initial subset region of the frame in the second orientation includes the second region including the second feature;

determining, by the image processor, that the initial subset region excludes the first region including the first feature corresponding to the first selected coordinate; and modifying, by the image processor, the initial subset region of the frame to include the first region comprising the first feature and the second region comprising the second feature to generate the subset region of the frame in the second orientation, responsive to determining that the initial subset region excludes the first region.

3. The method of claim 1, further comprising:

identifying, by the image analyzer, for each frame belonging to the scene, the first region and the second region comprising the first feature and the second feature within the frame; and wherein cropping further comprises cropping, responsive to the identification of the first region and the second region in each frame of the set of frames, the frame to include the first region and the second region within the predetermined display area comprising the subset region of the frame in the second orientation.

4. The method of claim 1, wherein receiving the first selected coordinate on the frame further comprises receiving, via the user interface, a bounding box on the frame of the set of frames identified as belonging to the scene; and wherein identifying the first region further comprises identifying the first region comprising the first feature based on the bounding box selected using the user interface.

5. The method of claim 1, further comprising receiving, by the focus region analyzer, via the user interface, the second selected coordinate on the frame of the subset of frames, subsequent to cropping the frame;

adjusting, by the image analyzer, the first region to generate a fourth region comprising the first feature corresponding to the second selected coordinate;

generating, by the cropping calculator executing on the computing device, a fourth score for the first feature, a fifth score for the second feature, and a sixth score for a third feature, the sixth score greater than the fifth score based on a first distance between the second selected coordinate and the second feature and a second distance between the second selected coordinate and the third feature; and cropping, by the image processor, the frame to include a third region corresponding to the third feature and the fourth region within a second predetermined display area comprising a second subset region of the frame in the second orientation.

6. The method of claim 1, further comprising:

receiving, by the focus region analyzer, via the user interface, a feature identifier for a second frame of the set of frames identified as belonging to the scene;

identifying, by the image analyzer, within the second frame a fourth region comprising a fourth feature corresponding to the feature identifier using a semantic knowledge graph;

identifying, by the image analyzer, within the second frame a fifth region comprising a fifth feature;

generating, by the cropping calculator, a fourth score for the fourth feature, a fifth score for the fifth feature, the fourth score greater than the fifth score based on the fourth feature corresponding to the feature identifier received via the user interface; and cropping, by the image processor, the second frame of the set of frames identified as belonging to the scene to include the fourth region and the fifth region within a second predetermined display area comprising a subset region of the second frame in the second orientation.

7. The method of claim 1, further comprising:

receiving, by the focus region analyzer, via the user interface, an overlay image to add to the frame at a specified coordinate; and adding, by the image processor, subsequent to the cropping of the frame, the overlay image to the subset region of the frame at the specified coordinate.

8. The method of claim 1, wherein the second feature comprises text, and wherein generating the second score for the second feature further comprises generating the second score for the second feature based on at least one of a characteristic of the second feature proportional to a size of the text and a distance of the text from a center of the frame.

9. The method of claim 1, wherein the second feature comprises a face, and wherein generating the second score for the second feature based on a characteristic of the second feature further comprises generating the second score based on a size of the face relative to the frame.

10. A system for converting media dimensions, comprising:

a temporal analyzer executable on a computing device, configured to identify a set of frames from a video in a first orientation as belonging to a scene;

a focus region analyzer executable on the computing device, configured to receive, via a user interface, first and second selected coordinates on a frame of the set of frames identified as belonging to the scene;

an image analyzer executable on the computing device configured to:

identify a first region within the frame comprising a first feature corresponding to the first selected coordinate; and identify within the frame a second region comprising a second feature;

a cropping calculator executable on the computing device configured to:

generate a first score for the first feature and a second score for the second feature, the first score greater than the second score based on the first feature corresponding to the first selected coordinate; and determine that the second score exceeds a threshold; and an image processor executable on the computing device configured to crop, responsive to the determination, the frame of the set of frames identified as belonging to the scene to include the first region and the second region within a predetermined display area comprising a subset region of the frame in a second orientation, wherein the image analyzer is further configured to identify within the frame, a third region comprising a third feature corresponding to the second selected coordinate;

wherein the temporal analyzer is further configured to determine, between the frame and a second frame of the set of frames identified as belonging to the scene, a motion vector for the third feature; and wherein the image processor is further configured to crop the second frame of the set of frames identified as belonging to the scene based on the motion vector for the third feature.

11. The system of claim 10, wherein the image processor is further configured to:

identify an initial subset region of the frame in the second orientation includes the second region including the second feature;

determine that the initial subset region excludes the first region including the first feature corresponding to the first selected coordinate; and modify the initial subset region of the frame to include the first region comprising the first feature and the second region comprising the second feature to generate the subset region of the frame in the second orientation, responsive to determining that the initial subset region excludes the first region.

12. The system of claim 10, wherein the image analyzer is further configured to identify, for each frame belonging to the scene, the first region and the second region comprising the first feature and the second feature within the frame; and wherein the image processor is further configured to crop, responsive to the identification of the first region and the second region in each frame of the set of frames, the frame to include the first region and the second region within the predetermined display area comprising the subset region of the frame in the second orientation.

13. The system of claim 10, wherein the focus region analyzer is further configured to receive, via the user interface, a bounding box on the frame of the set of frames identified as belonging to the scene; and wherein the image analyzer is further configured to identify the first region comprising the first feature based on the bounding box selected using the user interface.

14. The system of claim 10, wherein the focus region analyzer is further configured to receive, via the user interface, the second selected coordinate on the frame of the subset of frames, subsequent to cropping the frame;

wherein the image analyzer is further configured to adjust the first region to generate a fourth region comprising the first feature corresponding to the second selected coordinate;

wherein the cropping calculator is further configured to generate a fourth score for the first feature, a fifth score for the second feature, and a sixth score for a third feature, the sixth score greater than the fifth score based on a first distance between the second selected coordinate and the second feature and a second distance between the second selected coordinate and the third feature; and wherein the image processor is further configured to crop the frame to include a third region corresponding to the third feature and the fourth region within a second predetermined display area comprising a second subset region of the frame in the second orientation.

15. The system of claim 10, wherein the focus region analyzer is further configured to receive, via the user interface, a feature identifier for a second frame of the set of frames identified as belonging to the scene;

wherein the image analyzer is further configured to identify, within the second frame a fourth region comprising a fourth feature corresponding to the feature identifier using a semantic knowledge graph and to identify, within the second frame a fifth region comprising a fifth feature;

wherein the cropping calculator is further configured to generate a fourth score for the fourth feature, a fifth score for the fifth feature, the fourth score greater than the fifth score based on the fourth feature corresponding to the feature identifier received via the user interface; and wherein the image processor is further configured to crop the second frame of the set of frames identified as belonging to the scene to include the fourth region and the fifth region within a second predetermined display area comprising a subset region of the second frame in the second orientation.

16. The system of claim 10, wherein the image analyzer is further configured to identify a fourth region within the frame comprising a fourth feature;

wherein the cropping calculator is further configured to generate a fourth score for the fourth region and to determine that the fourth score is less than the threshold; and wherein the image processor is further configured to crop the fourth region from the frame responsive to the determination.

17. The system of claim 10, wherein the second feature comprises text, and wherein the cropping calculator is further configured to generate the second score for the second feature based on at least one of a characteristic of the second feature proportional to a size of the text and a distance of the text from a center of the frame.

18. The system of claim 10, wherein the second feature comprises a face, and wherein the cropping calculator is further configured to generate the second score based on a size of the face relative to the frame.

* * * * *